United States Patent
Nammi et al.

(10) Patent No.: US 10,812,237 B2
(45) Date of Patent: *Oct. 20, 2020

(54) ADAPTIVE CHANNEL STATE INFORMATION REFERENCE SIGNAL CONFIGURATIONS FOR A 5G WIRELESS COMMUNICATION NETWORK OR OTHER NEXT GENERATION NETWORK

(71) Applicant: AT&T Intellectual Property I, L.P., Atlanta, GA (US)

(72) Inventors: SaiRamesh Nammi, Kista (SE); Xiaoyi Wang, Austin, TX (US); Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/546,856

(22) Filed: Aug. 21, 2019

(65) Prior Publication Data

US 2019/0379504 A1 Dec. 12, 2019

Related U.S. Application Data

(63) Continuation of application No. 16/263,054, filed on Jan. 31, 2019, now Pat. No. 10,432,376, which is a (Continued)

(51) Int. Cl.
*H04L 5/00* (2006.01)

(52) U.S. Cl.
CPC .......... *H04L 5/0048* (2013.01); *H04L 5/0044* (2013.01); *H04L 5/0057* (2013.01); *H04L 5/0092* (2013.01)

(58) Field of Classification Search
CPC ... H04L 5/0048; H04L 5/0044; H04L 5/0057; H04L 5/0092
See application file for complete search history.

(56) References Cited

U.S. PATENT DOCUMENTS 5,802,117 A 9/1998 Ghosh
6,985,531 B2 1/2006 McCarty, Jr.
(Continued)

FOREIGN PATENT DOCUMENTS

CN 103098399 A 5/2013
EP 1 983 653 A1 10/2008
(Continued)

OTHER PUBLICATIONS

"5G Waveform & Multiple Access Techniques", URL: https://www.qualcomm.com/media/documents/files/5g-research-on-waveform-and-multiple-access-techniques.pdf, Nov. 4, 2015, 46 pages.
(Continued)

*Primary Examiner* — Alpus Hsu
*Assistant Examiner* — Camquyen Thai
(74) *Attorney, Agent, or Firm* — Amin, Turocy & Watson, LLP

(57) ABSTRACT

In mixed numerology case, the performance of a physical downlink shared channel (PDSCH) can be improved by multiplexing PDSCH of one numerology with the channel state information reference signals (CSI-RS) of the other numerology and use of an advanced receiver. However, due to the interference from the PDSCH of the other numerology, the channel estimation for the underlying UE can be impacted if the CSI-RS is corrupted. An adaptive CSI-RS configuration can be deployed where the CSI-RS density is adapted based on the PDSCH transmission of the other numerology. Namely, based on the scheduling decision of the other numerology, the CSI-RS density can be changed. Thus, the impact on channel estimation can be minimized when the data channel of one numerology is multiplexed with the CSI-RS of the other numerology.

20 Claims, 16 Drawing Sheets

Related U.S. Application Data continuation of application No. 15/400,379, filed on Jan. 6, 2017, now Pat. No. 10,237,032.

(56) References Cited

U.S. PATENT DOCUMENTS

| | | |
|---|---|---|
| 6,993,294 B2 | 1/2006 | Nobukiyo et al. |
| 7,088,782 B2 | 8/2006 | Mody et al. |
| 7,359,311 B1 | 4/2008 | Paranjpe et al. |
| 7,386,306 B2 | 6/2008 | Laroia et al. |
| 7,450,548 B2 | 11/2008 | Haustein et al. |
| 7,499,515 B1 | 3/2009 | Beadle |
| 7,567,502 B2 | 7/2009 | Laroia et al. |
| 7,633,924 B2 | 12/2009 | Fujii et al. |
| 7,639,639 B2 | 12/2009 | Herdin |
| 7,706,458 B2 | 4/2010 | Mody et al. |
| 7,787,358 B2 | 8/2010 | Wilhelmsson et al. |
| 7,813,371 B2 | 10/2010 | McNew et al. |
| 7,826,541 B2 | 11/2010 | Fujii et al. |
| 7,885,214 B2 | 2/2011 | Ahmadi et al. |
| 8,018,855 B2 | 9/2011 | Englund et al. |
| 8,077,595 B2 | 12/2011 | Bhushan et al. |
| 8,159,979 B2 | 4/2012 | Lee et al. |
| 8,223,737 B2 | 7/2012 | Nangia et al. |
| 3,259,695 A1 | 9/2012 | Lee et al. |
| 8,259,828 B2 | 9/2012 | Fu et al. |
| 8,369,468 B2 | 2/2013 | da Silva et al. |
| 8,400,939 B2 | 3/2013 | Kim et al. |
| 8,576,936 B2 | 11/2013 | Ericson et al. |
| 8,605,687 B2 | 12/2013 | Barak et al. |
| 8,634,334 B2 | 1/2014 | Ahmadi |
| 8,634,363 B2 | 1/2014 | Kim et al. |
| 8,780,941 B2 | 7/2014 | Dor et al. |
| 8,842,628 B2 | 9/2014 | Gao et al. |
| 8,913,479 B2 | 12/2014 | Bhushan et al. |
| 8,917,686 B2 | 12/2014 | Lee et al. |
| 8,953,615 B2 | 2/2015 | Cai et al. |
| 8,989,208 B2 | 3/2015 | Chen et al. |
| 9,036,520 B2 | 5/2015 | Montojo et al. |
| 9,065,586 B2 | 6/2015 | Jacob et al. |
| 9,094,966 B2 | 7/2015 | Kim et al. |
| 9,100,093 B2 | 8/2015 | Branlund et al. |
| 9,100,870 B2 | 8/2015 | Yang et al. |
| 9,148,256 B2 | 9/2015 | Sampath et al. |
| 9,160,439 B2 | 10/2015 | Li |
| 9,203,656 B2 | 12/2015 | Higashinaka |
| 9,210,712 B2 | 12/2015 | Hwang et al. |
| 9,264,249 B2 | 2/2016 | Zhang et al. |
| 9,300,424 B2 | 3/2016 | Seo et al. |
| 9,351,293 B2 | 5/2016 | Chen et al. |
| 9,439,135 B2 | 9/2016 | Ahn et al. |
| 9,444,535 B2 | 9/2016 | Dinan |
| 9,479,300 B2 | 10/2016 | Kim et al. |
| 9,509,464 B2 | 11/2016 | Cai et al. |
| 9,516,644 B2 | 12/2016 | Pan et al. |
| 9,531,521 B2 | 12/2016 | Ng |
| 9,717,086 B2 | 7/2017 | Zhang et al. |
| 9,820,281 B1 | 11/2017 | Werner et al. |
| 10,020,927 B2 | 7/2018 | Lee et al. |
| 2002/0181509 A1 | 12/2002 | Mody et al. |
| 2003/0016622 A1 | 1/2003 | McCarty, Jr. |
| 2005/0190822 A1 | 9/2005 | Fujii et al. |
| 2005/0233752 A1 | 10/2005 | Laroia et al. |
| 2006/0239370 A1 | 10/2006 | Mody et al. |
| 2007/0036071 A1 | 2/2007 | Herdin |
| 2008/0165866 A1 | 7/2008 | Teo et al. |
| 2009/0022050 A1 | 1/2009 | Ohta |
| 2009/0202010 A1 | 8/2009 | Fu et al. |
| 2011/0103243 A1 | 5/2011 | Larsson et al. |
| 2011/0182332 A1 | 7/2011 | Ericson et al. |
| 2011/0269442 A1 | 11/2011 | Han et al. |
| 2012/0307706 A1 | 12/2012 | Nakano et al. |
| 2013/0028150 A1 | 1/2013 | Ma et al. |
| 2013/0170464 A1 | 7/2013 | Hwang et al. |
| 2013/0194931 A1 | 8/2013 | Lee et al. |
| 2013/0203398 A1 | 8/2013 | Callard et al. |
| 2013/0295925 A1 | 11/2013 | Jacob et al. |
| 2014/0044040 A1 | 2/2014 | Chen et al. |
| 2014/0078982 A1 | 3/2014 | Nammi et al. |
| 2014/0086188 A1 | 3/2014 | Hoymann et al. |
| 2014/0126485 A1 | 5/2014 | Chen et al. |
| 2014/0177457 A1 | 6/2014 | Grosspietsch et al. |
| 2014/0179363 A1 | 6/2014 | Nishikawa et al. |
| 2014/0194155 A1 | 7/2014 | Ko et al. |
| 2014/0341051 A1 | 11/2014 | Gaal et al. |
| 2015/0029875 A1 | 1/2015 | Zhu et al. |
| 2015/0270917 A1 | 1/2015 | Roman et al. |
| 2015/0131560 A1 | 5/2015 | Von Elbwart et al. |
| 2015/0131756 A1 | 5/2015 | Suh et al. |
| 2015/0146545 A1 | 5/2015 | Davydov et al. |
| 2015/0146653 A1 | 5/2015 | Zhang et al. |
| 2015/0180622 A1 | 6/2015 | Yoo et al. |
| 2015/0200755 A1 | 7/2015 | Hammarwall et al. |
| 2015/0207647 A1 | 7/2015 | Higashinaka |
| 2015/0223245 A1 | 8/2015 | Cheng et al. |
| 2015/0257139 A1 | 9/2015 | Chen et al. |
| 2015/0288475 A1 | 10/2015 | Tabet et al. |
| 2015/0312927 A1 | 10/2015 | Ko et al. |
| 2015/0349987 A1 | 12/2015 | Soriaga et al. |
| 2015/0372851 A1 | 12/2015 | Kakishima et al. |
| 2016/0006487 A1 | 1/2016 | Ding et al. |
| 2016/0007280 A1 | 1/2016 | Ktenas et al. |
| 2016/0143055 A1 | 5/2016 | Nammi et al. |
| 2016/0156397 A1 | 6/2016 | Onggosanusi et al. |
| 2016/0156401 A1 | 6/2016 | Onggosanusi et al. |
| 2016/0182134 A1 | 6/2016 | Kol et al. |
| 2016/0248555 A1 | 8/2016 | Lei et al. |
| 2016/0255611 A1 | 9/2016 | Damnjanovic et al. |
| 2016/0294531 A1 | 10/2016 | Loehr et al. |
| 2016/0337056 A1 | 11/2016 | Frenne et al. |
| 2016/0352551 A1 | 12/2016 | Zhang et al. |
| 2016/0373195 A1 | 12/2016 | Kato et al. |
| 2017/0099126 A1 | 4/2017 | Yoo et al. |
| 2017/0118055 A1 | 4/2017 | Guey et al. |
| 2017/0134199 A1 | 5/2017 | Wang et al. |
| 2017/0215170 A1 | 7/2017 | Islam et al. |
| 2017/0325250 A1 | 11/2017 | Manolakos et al. |
| 2017/0332378 A1 | 11/2017 | Werner et al. |
| 2018/0019795 A1 | 1/2018 | Zhang et al. |
| 2018/0049047 A1* | 2/2018 | Lin .................. H04W 72/04 |
| 2018/0049222 A1* | 2/2018 | Manolakos ....... H04W 72/1263 |
| 2018/0084506 A1 | 3/2018 | Min et al. |
| 2018/0092002 A1 | 3/2018 | Manolakos et al. |
| 2018/0098312 A1 | 4/2018 | Lin et al. |
| 2018/0109406 A1 | 4/2018 | Wang et al. |

FOREIGN PATENT DOCUMENTS

| | | |
|---|---|---|
| EP | 2 618 504 A2 | 7/2013 |
| EP | 2 771 999 A2 | 9/2014 |
| JP | H09-284200 A | 10/1997 |
| JP | 2010-178237 A | 8/2010 |
| KR | 10-2012-0028203 A | 3/2012 |
| KR | 10-2012-0061881 A | 6/2012 |
| KR | 10-1480531 B1 | 1/2015 |
| KR | 10-1617348 B1 | 5/2016 |
| RU | 2 530 749 C2 | 10/2014 |
| RU | 2 545 527 C2 | 4/2015 |
| WO | 2009/052420 A2 | 4/2009 |
| WO | 2010/138921 A2 | 12/2010 |
| WO | 2012/036439 A2 | 3/2012 |
| WO | 2012/041016 A2 | 4/2012 |
| WO | 2012/036439 A3 | 5/2012 |
| WO | 2013/135140 A1 | 9/2013 |
| WO | 2014/021986 A1 | 2/2014 |
| WO | 2014/107904 | 7/2014 |
| WO | 2016/066231 A1 | 5/2016 |
| WO | 2016/099830 A1 | 6/2016 |
| WO | 2016/123393 A1 | 8/2016 |
| WO | 2016/130175 A1 | 8/2016 |
| WO | 2016/146165 A1 | 9/2016 |

(56) References Cited

FOREIGN PATENT DOCUMENTS

| WO | 2016/153548 A1 | 9/2016 |
| WO | 2016/172652 A1 | 10/2016 |

OTHER PUBLICATIONS

Agyapong et al., "Design considerations for a 5G network architecture", URL: https://pdfs.semanticscholar.org/9985/884596b7c4143b0f11ecf9febcbd7f7686eb.pdf, IEEE Communications Magazine, 2014, pp. 1-19, vol. 52, No. 11.

Levanen et al., "Radio Interface Evolution Towards 5G and Enhanced Local Area Communications", URL: http://ieeexplore.ieee.org/stamp/stamp.jsp?tp=&arnumber=6891105, IEEE Access, Journals & Magazines, 2014, pp. 1005-1029, vol. 2.

Mogensen et al., "5G small cell optimized radio design", URL: http://vbn.aau.dk/files/195969578/Globecom_5G_2013_v16emb.pdf, Globecom, IEEE Conference and Exhibition, 2013, 7 pages.

Pitaval et al., "Spectrally-Precoded OFDM for 5G Wideband Operation in Fragmented sub-6GHz Spectrum", URL: http://arxiv.org/pdf/1606.00623, 2016, 12 pages.

Rajagopal et al., "Multi-User MIMO with flexible numerology for 5G", URL: https://arxiv.org/pdf/1610.03056, 2016, 6 pages.

"OFDM Systems—Why Cyclic Prefix?", URL: http://sites.google.com/site/mdanishnisar/pubs/01_OFDM_Tutorial_Nisar.pdf, Draft google.com, Feb. 2008, 4 pages.

Luo et al., "Millimeter-Wave Air-Interface for 5G: Challenges and Design Principles", URL: https://pdfs.semanticscholar.org/2223/b6797ecc8fbbdd89a084c15ddf76099ed9df.pdf, Proc. ETSI Workshop. on Future Radio Technologies-Air Interfaces, 2016, pp. 1-10.

Simsek et al., "5Genabled tactile Internet", URL: https://www.researchgate.net/publication/294108489_5G-Enabled_Tactile_Internet, IEEE Journal on Selected Areas in Communications, 2016, pp. 460-473, vol. 34, No. 3.

Popovski et al., "Mobile and Wireless Communications Enablers for the Twenty-Twenty Infonmation Society (METIS)", Proposed Solutions for New Radio Access, Document No. ICT-317669-METIS/D2.4, URL: http://publications.lib.chalmers.se/records/fulltext/220587/local_220587.pdf, 2015, 190 pages.

Wild et al., "A Reduced Complexity Transmitter for UFOFDM", IEEE 81st Vehicular Technology Conference (VTC Spring) IEEE 2015, URL: https://www.researchgate.net/profile/Thorsten_Wild/publication/276419672_A_reduced_complexity_transmitter_for_UFOFDM/ links/5559cce408ae980ca610919b.pdf, 2015, 6 pages.

Non-Final Office Action received for U.S. Appl. No. 15/400,379 dated Jun. 29, 2018, 40 pages.

Non-Final Office Action received for U.S. Appl. No. 15/401,083 dated Apr. 16, 2018, 208 pages.

Non-Final Office Action received for U.S. Appl. No. 15/341,927 dated Aug. 6, 2018, 35 pages.

Final Office Action received for U.S. Appl. No. 15/401,083 dated Oct. 10, 2018, 46 pages.

Notice of Allowance received for U.S. Appl. No. 15/401,083 dated Jan. 28, 2019, 24 pages.

Notice of Allowance received for U.S. Appl. No. 15/341,927 dated Feb. 6, 2019, 26 pages.

Non-Final Office Action received for U.S. Appl. No. 16/395,812 dated Nov. 15, 2019, 52 pages.

Non-Final Office Action received for U.S. Appl. No. 16/402,511 dated Oct. 31, 2019, 43 pages.

Notice of Allowance received for U.S. Appl. No. 16/395,812 dated Mar. 20, 2020, 32 pages.

Final Office Action received for U.S. Appl. No. 16/402,511 dated May 13, 2020, 18 pages.

Notice of Allowance received for U.S. Appl. No. 16/402,511 dated Jul. 27, 2020, 17 pages.

\* cited by examiner

ADAPTIVE CHANNEL STATE INFORMATION REFERENCE SIGNAL CONFIGURATIONS FOR A 5G WIRELESS COMMUNICATION NETWORK OR OTHER NEXT GENERATION NETWORK

RELATED APPLICATION

The subject patent application is a continuation of, and claims priority to each of, U.S. patent application Ser. No. 16/263,054 (now U.S. Pat. No. 10,432,376), filed Jan. 31, 2019, and entitled "ADAPTIVE CHANNEL STATE INFORMATION REFERENCE SIGNAL CONFIGURATIONS FOR A 5G WIRELESS COMMUNICATION NETWORK OR OTHER NEXT GENERATION NETWORK," which is a continuation of U.S. patent application Ser. No. 15/400,379 (issued as U.S. Pat. No. 10,237,032), filed Jan. 6, 2017, and entitled "ADAPTIVE CHANNEL STATE INFORMATION REFERENCE SIGNAL CONFIGURATIONS FOR A 5G WIRELESS COMMUNICATION NETWORK OR OTHER NEXT GENERATION NETWORK," the entireties of which applications are hereby incorporated by reference herein

TECHNICAL FIELD

This disclosure relates generally to facilitating a wireless communication system. For example, this disclosure relates to facilitating an adaptive channel state information reference signal configuration for a 5G, or other next generation network.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption and lower latency than 4G equipment.

The above-described background relating to facilitating an adaptive channel state information reference signal configurations for a 5G network is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
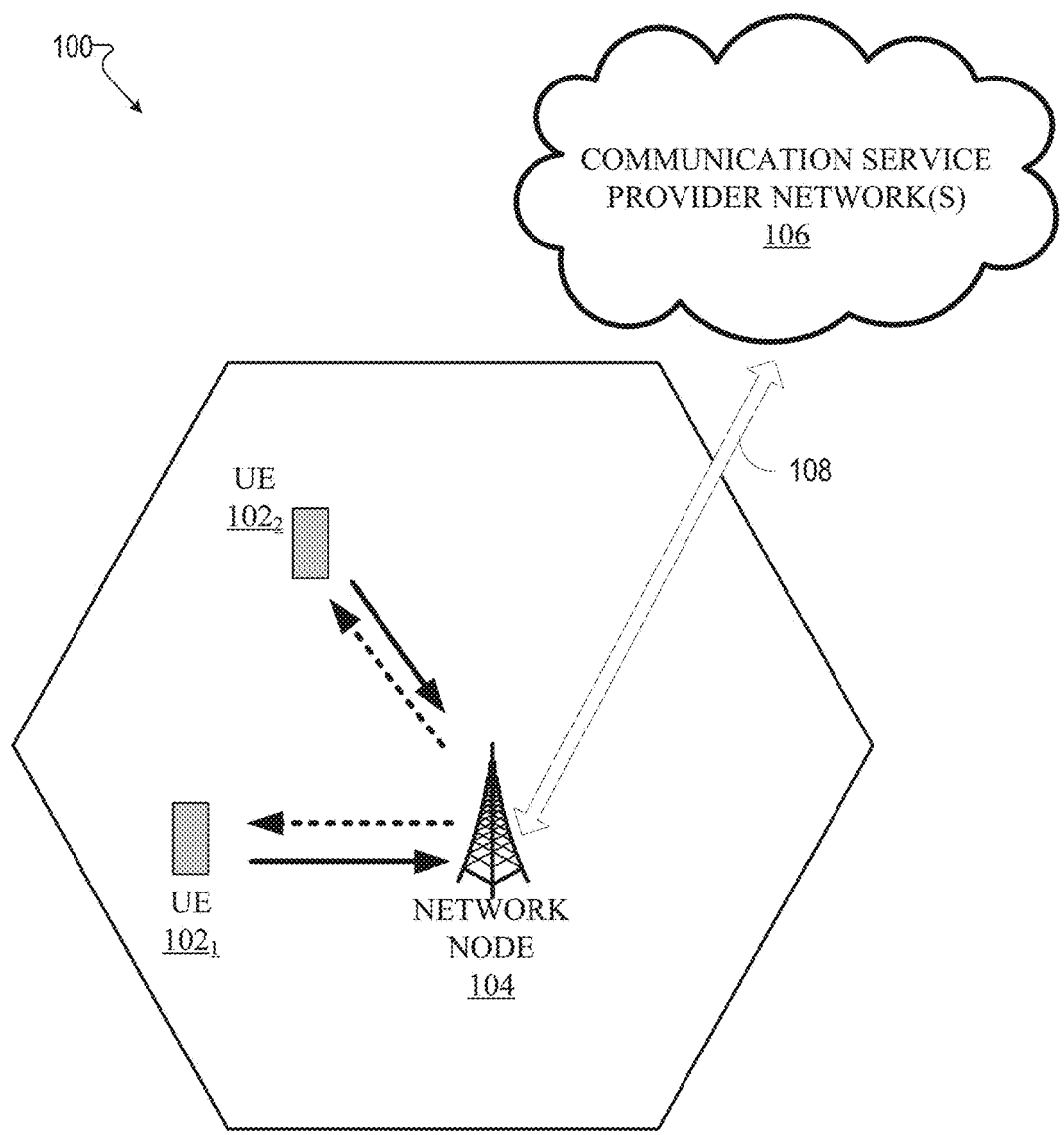
FIG. 1 illustrates an example wireless communication system in which a network node and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate adaptive CSI-RS configurations for a 5G or other next generation network. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate adaptive CSI-RS configurations for a 5G or other next generation network. Facilitating adaptive CSI-RS configurations for a 5G network can be implemented in connection with any type of device with a connection to the communications network (e.g., a mobile handset, a computer, a handheld device, etc.) any Internet of things (IOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate adaptive CSI-RS configurations for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied to 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier systems such as orthogonal frequency division multiplexing (OFDM), each subcarrier can occupy bandwidth (e.g., subcarrier spacing). If the carriers use the same bandwidth spacing, then the subcarriers can be considered to comprise a single numerology (i.e., single subcarrier spacing). However, if the subcarriers occupy different bandwidth and/or spacing, then the subcarriers can be considered to comprise multiple numerologies (i.e., multiple subcarrier spacing). A subcarrier with a different numerology can interfere with another subcarrier and/or subcarrier spacing.

Downlink reference signals can be predefined signals occupying specific resource elements within a downlink time—frequency grid. There are several types of downlink reference signals that can be transmitted in different ways and used for different purposes by a receiving terminal. Channel state information reference signals (CSI-RS) can be used by terminals to acquire channel-state information (CSI) and beam specific information (e.g., beam reference signal received power). In 5G, CSI-RS can be user equipment (UE) specific so it can have a significantly lower time/frequency density. Demodulation reference signals (DM-RS), also sometimes referred to as UE-specific reference signals, can be used by terminals for channel estimation of data channels. The label "UE-specific" relates to the demodulation reference signal being intended for channel estimation by a single terminal. The demodulation reference signal can then be transmitted within the resource blocks assigned for data traffic channel transmission to that terminal. Other than the aforementioned reference signals, there are other reference signals, namely multi-cast broadcast single frequency network (MBSFN) and positioning reference signals that can be used for various purposes.

CSI-RS signal transmission is important for estimating the CSI. Although resources needed for CSI-RS can be small, when multiple numerologies are deployed within the same OFDM bandwidth, using a conventional approach (as in LTE), estimating the CSI can comprise a CSI-RS resource grid for every numerology. Time-frequency resources for CSI-RS can be high and occupy a lot of bandwidth, thereby reducing the number of resources for data transmission. Therefore, significant loss in data throughput can limit the system capacity.

This disclosure comprises several solutions for allocating the CSI-RS resources when multiple numerologies are deployed. Additionally, this disclosure comprises methods, at the receiver, for estimating the channel from CSI-RS when multiple numerologies are deployed. Hence, channel interference can be reduced by dynamically changing the CSI-RS density (e.g., the number of pilots and/or reference symbols per reference signal) of the system.

In a mixed numerology case, the performance of a physical downlink shared channel (PDSCH) can be improved by multiplexing the PDSCH of one numerology with the CSI-RS of another numerology and the use of an advanced receiver. However, due to the interference from the PDSCH of the other numerology, the channel estimation for the underlying UE can be impacted if the CSI-RS is corrupted. An adaptive CSI-RS configuration can be deployed where the CSI-RS density is adapted based on the PDSCH transmission of the other numerology. Namely, based on the scheduling decision of the other numerology, the CSI-RS density can be changed. Thus, the impact on channel estimation can be minimized by multiplexing the data channel of one numerology with the CSI-RS of the other numerology. Thus, with the increase in CSI-RS density, the mean square error reduces, thereby providing significant gains in link and system throughputs.

For a mixed numerology case, rate matching can be inefficient and depend on the numerology mix. Therefore, the underlying PDSCH should be rate matched around the CSI-RS. Alternatively, the PDSCH transmitted can be multiplexed with the CSI-RS of the other numerology. For example, the scenario of 15 KHZ and 60 KHZ mixing can comprise two resource elements allocated for CSI-RS transmission. Then, for the PDSCH transmission for 15 KHz subcarrier spacing, a multiplex of 2*(60/15) can equal 8 resource elements. Therefore, significant gains can be expected for higher numerologies with the proposed system. Note that the above system assumes that the underlying receiver can cancel the CSI-RS interference due to a 15 KHz spacing carrier. Also note that since CSI-RS and PDSCH are multiplexed, additional CSI-RS resources can be used for better channel estimation. The above technique can be extended by varying (reducing/increasing) the power of CSI-RS of the higher numerology carrier and using a higher density of CSI-RS resources. Consequently, the receiver does not require cancelling of the CSI-RS of the other numerology.

The UE can estimate the channel from the CSI-RS and also detect data when the CSI-RS is multiplexed with the data channel. For channel estimation at the receiver side, the UE can leverage the following equations. The received signal for the $K^{th}$ subcarrier can be written as:

$$y(k)=H(k)x(k)+n, \quad \text{Equation (1)}$$

where: Y(k) is a received complex symbol value, X(k) is a transmitted complex symbol value, H(k) is a complex channel gain experienced by a symbol, and N is the complex noise and interference caused by the other numerology.

Since CSI-RS can carry the known pilot symbols at the transmitter and at the receiver, the channel estimate can be given by He(k) and computed based on either least squares, MSE, or another estimation technique. For example, using least squares can compute:

$$He(k)=y^h(k)x^h(k) \quad \text{Equation (2)}$$

For data estimation for the numerologies, which are different compared to the CSI-RS numerology, the received signal for the $j^{th}$ subcarrier can be written as:

$$y(j)=H(j)x(j)+Hr(j)xr(j)+n \quad \text{Equation (3)}$$

where, Y(j) is a received complex symbol value, X(j) is a transmitted complex symbol value, H(j) is a complex channel gain experienced by a symbol, Hr(j) is a complex channel gain experienced by a symbol in the CSI-RS numerology, Xr(j) is the CSI-RS transmitted symbol, and N is the complex noise. Since the receiver can estimate the channel, the receiver can subtract the contribution due to CSI-RS in this numerology.

Hence, after subtraction, the received signal can be given by:

$$y(j)-Hr(j)xr(j)=H(j)x(j)+n \quad \text{Equation (4)}$$

Once the component due to CSI-RS is subtracted from the received signal, conventional detection techniques can be used to detect the data in the other numerology.

When mixed numerologies are deployed within one OFDM carrier, there are instances when one numerology UE can be scheduled in any part of the OFDM bandwidth. For instance, one numerology can be scheduled in one part of the OFDM bandwidth and in another instance, another numerology (e.g., the interfering numerology can be scheduled in another part of the OFDM bandwidth. In these cases, the CSI-RS density can adapt according to the PDSCH location of the interfering numerology. Hence the CSI-RS density can depend on the scheduling decision. Therefore the network can indicate the CSI-RS density on those resource blocks where the PDSCH location of the other numerology is mixed with CSI-RS dynamically. In one technique, the network can send this information to the physical layer signaling, such as a request to send the CSI at irregular intervals (aperiodic) and/or on demand CSI as part of the uplink control channel or the downlink control channel.

In the case of a semi-static indication of CSI-RS density, if the network decides to use a different numerology PDSCH in certain resource blocks for longer time periods, then the network can configure those resource blocks with high CSI-RS density and inform the UE about the pattern using RRC signaling.

In one embodiment, described herein is a method comprising deploying a first subcarrier spacing and a second subcarrier spacing, wherein the second subcarrier spacing is different from the first subcarrier spacing. Based on a physical downlink shared channel location of the second subcarrier spacing, the method can comprise adjusting a number of channel state data reference signals, resulting in an adjusted number of the channel state data reference signals. Consequently, the method can comprise sending the adjusted number of the channel state data reference signals to a mobile device.

According to another embodiment, a network device can facilitate, the scheduling of a first subcarrier spacing within a first part of an orthogonal frequency division multiplexing bandwidth, and scheduling of a second subcarrier spacing within a second part of the orthogonal frequency division multiplexing bandwidth different than the first part. Based on a physical downlink shared channel of the second subcarrier spacing, the network device can facilitate adjusting channel state data reference signals, resulting in adjusted channel state data reference signals. Consequently, the network device can facilitate sending data associated with the adjusted channel state data reference signals to a mobile device.

According to yet another embodiment, described herein is a machine-readable storage medium that can perform the operations comprising generating a first subcarrier spacing within a first part of an orthogonal frequency division multiplexing bandwidth, and generating a second subcarrier spacing within a second part of the orthogonal frequency division multiplexing bandwidth, wherein the first subcarrier spacing is different than the second subcarrier spacing. Based on a physical downlink shared channel location of the second subcarrier spacing, the machine-readable storage medium can perform the operations comprising increasing channel state data reference signals, resulting in additional channel state data reference signals other than the channel state data reference signals. Additionally, the machine-readable storage medium can perform the operations comprising transmitting data associated with the additional channel state data reference signals to a mobile device.

These and other embodiments or implementations are described in more detail below with reference to the drawings.

FIG. 1 illustrates an example wireless communication system 100 in accordance with various aspects and embodiments of the subject disclosure. In example embodiments, system 100 is or comprises a wireless communication network serviced by one or more wireless communication network providers. In example embodiments, system 100 can comprise one or more user equipment (UEs) 102 (e.g., 1021, 1022 . . . 102n), which can comprise one or more antenna panels comprising vertical and horizontal elements. A UE 102 can be any user equipment device, such as a mobile phone, a smartphone, a cellular enabled laptop (e.g., comprising a broadband adapter), a tablet computer, a wearable device, a virtual reality (VR) device, a heads-up display (HUD) device, a smart car, a machine-type communication (MTC) device, and the like. UE 102 can also comprise IOT devices that can communicate wirelessly. UE 102 roughly corresponds to the mobile station (MS) in global system for mobile communications (GSM) systems. Thus, the network node 104 (e.g., network node device) can provide connectivity between the UE and the wider cellular network and can facilitate wireless communication between the UE and the wireless communication network (e.g., the one or more communication service provider networks 106, described in more detail below) via a network node 104. The UE 102 can send and/or receive communication data wirelessly to the network node 104. The dashed arrow lines from the network node 104 to the UE 102 represent downlink (DL) communications and the solid arrow lines from the UE 102 to the network nodes 104 represent uplink (UL) communications.

The non-limiting term network node (e.g., network node device) can be used herein to refer to any type of network node serving a UE 102 and/or connected to other network nodes, network elements, or another network node from which the UE 102 can receive a radio signal. In typical cellular radio access networks (e.g., universal mobile telecommunications system (UMTS) networks), they can be referred to as base transceiver stations (BTS), radio base station, radio network nodes, base stations, NodeB, eNodeB (e.g., evolved NodeB), etc.). In 5G terminology, the node can be referred to as a gNodeB (e.g., gNB) device. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes (e.g., network node 104) can include but are not limited to: NodeB devices, base station (BS) devices, access point (AP) devices, and radio access network (RAN) devices. The network node 104 can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like.

System 100 can further comprise one or more communication service provider networks 106 that facilitate providing wireless communication services to various UEs, comprising UE 102, via the network node 104 and/or various additional network devices (not shown) included in the one or more communication service provider networks 106. The one or more communication service provider networks 106 can include various types of disparate networks, comprising: cellular networks, femto networks, picocell networks, microcell networks, internet protocol (IP) networks Wi-Fi service networks, broadband service network, enterprise networks, cloud based networks, and the like. For example, in at least one implementation, system 100 can be or can comprise a large scale wireless communication network that spans various geographic areas. According to this implementation, the one or more communication service provider networks 106 can be or can comprise the wireless communication network and/or various additional devices and components of the wireless communication network (e.g., additional network devices and cells, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

In one technique, the UE 102 can send a reference signal back to the network node 104. The network node 104 takes a received reference signal from the UE 102, estimates the condition of the channel, which can be influenced by various factors, such as objects in the line of sight, weather, movement, interference, etc., and after correcting for more issues (e.g., interference), adjusts the beamforming rates for each antenna transmitting to the UE 102, and changes parameters, so as to transmit a better beam toward the UE 102. This ability to select MIMO schemes and use beamforming to focus energy and adapt to changing channel conditions can allow for higher data rates.

Figure 2:
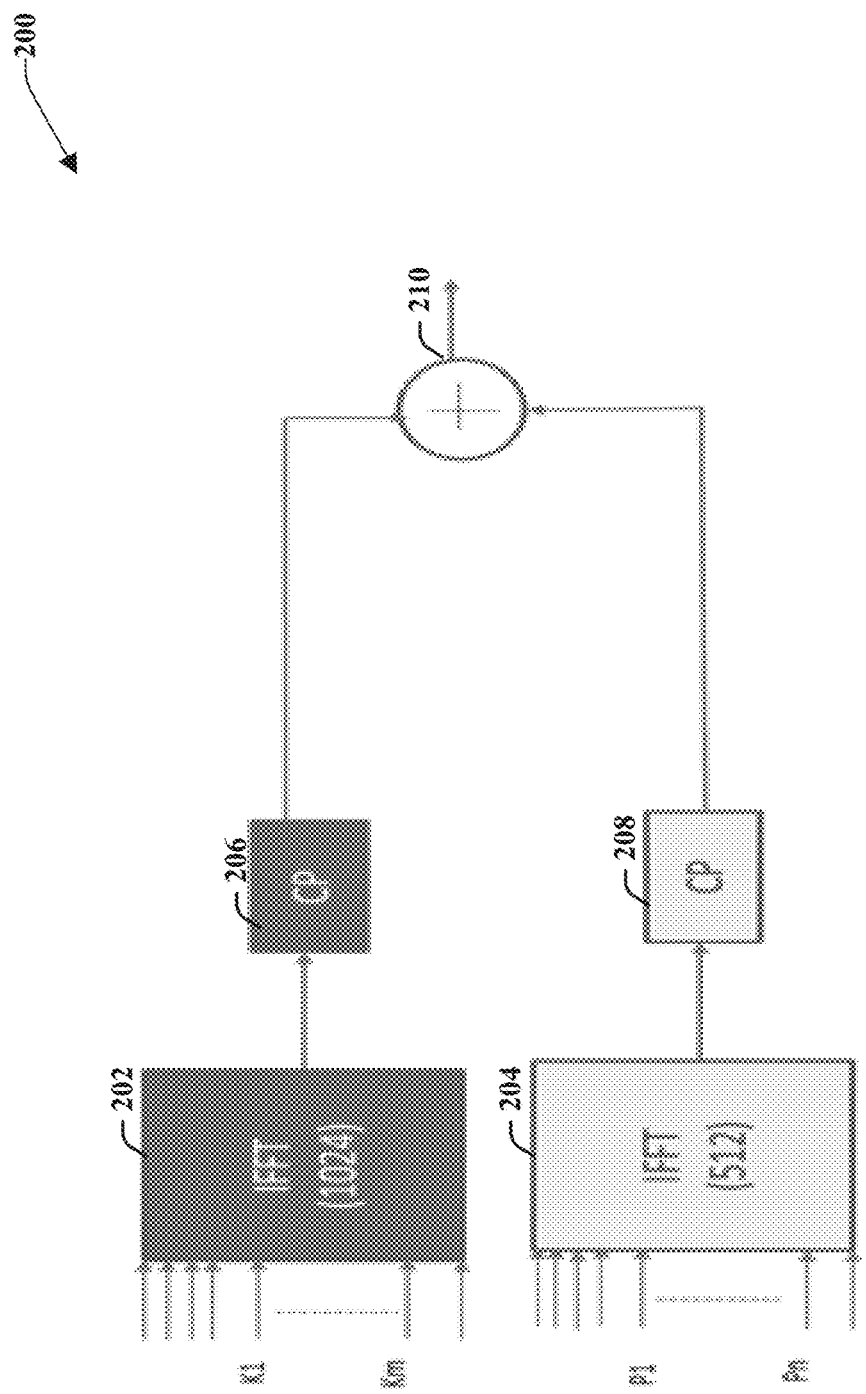
FIG. 2 illustrates an example schematic system block diagram of cyclic prefix orthogonal frequency-division multiplexing with mixed numerology according to one or more embodiments.

Referring now to FIG. 2, illustrated is an example schematic system block diagram of cyclic prefix orthogonal frequency-division multiplexing with mixed numerology according to one or more embodiments. As an example of multiple numerology, FIG. 2 depicts the block diagram of the CP-OFDM transmitter in the mixed numerology case 200. The upper branch 202 uses numerology with subcarrier spacing of 15 KHz spacing, while the lower branch 204 uses subcarrier spacing of 30 KHz. The lower branch 204 can generate two OFDM symbols during the time the upper branch 202 can generate one OFDM symbol. If K1 to Km represent subcarrier indices for 15 KHz spacing and P1 to Pn represent subcarrier indices for 30 KHz spacing, then orthogonality can be lost due to mixed numerology. However, guard tones G, can be used to balance Equation 5, below, between the numerologies. Therefore, if G is the number of guard tones between these two numerologies, then:

$$P_1 = K_M/2 + G \qquad \text{Equation (5)}$$

cyclic-prefixes 206, 208 can be used to mitigate interference introduced by the upper branch 202 and the lower branch 204, respectively. Additionally, a summation block 210 can be used to apply the guard tones to assist in interference reduction.

Figure 3:
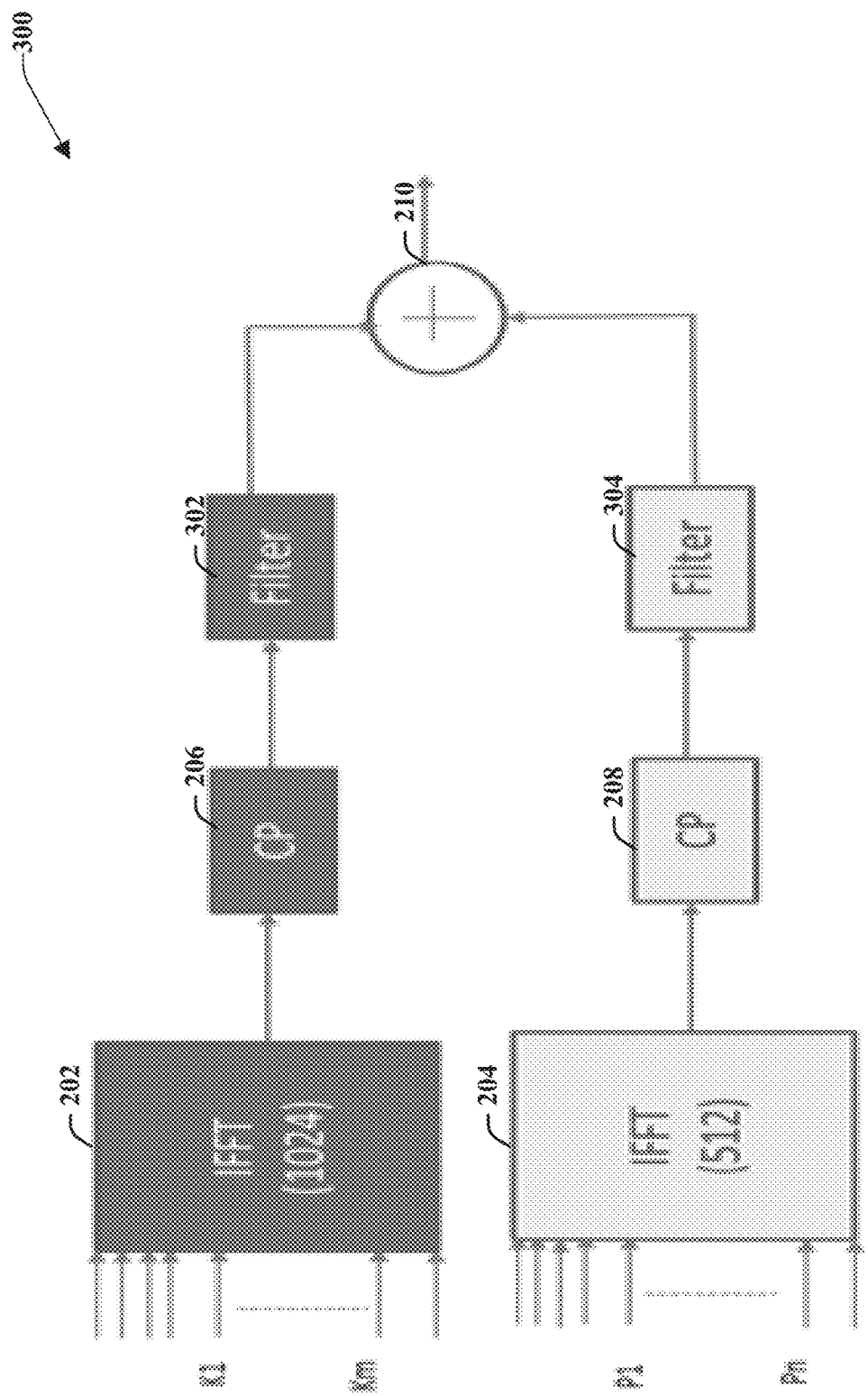
FIG. 3 illustrates an example schematic system block diagram of filtered orthogonal frequency-division multiplexing with mixed numerology according to one or more embodiments.

Referring now to FIG. 3, illustrated is an example schematic system block diagram of filtered orthogonal frequency-division multiplexing with mixed numerology according to one or more embodiments. FIG. 3 depicts the block diagram for a filtered OFDM with mixed numerology 300. The upper branch 202 uses numerology with subcarrier spacing of 15 KHz spacing, while the lower branch 204 uses subcarrier spacing of 30 KHz. The lower branch 204 can generate two OFDM symbols during the time the upper branch 202 can generate one OFDM symbol. If K1 to Km represent sub carrier indices for 15 KHz spacing and P1 to Pn represent subcarrier indices for 30 KHz spacing, then orthogonality can be lost due to mixed numerology. However, guard tones G, can be used to balance Equation 5, between the numerologies. Therefore, if G is the number of guard tones between these two numerologies, then cyclic-prefixes 206, 208 can be used to mitigate interference introduced by the upper branch 202 and the lower branch 204, respectively. Furthermore, each branch can leverage a transmission filter 302, 304 to minimize interference. The transmission filters 302, 304 can reduce certain aspects of the signals received from the cyclic-prefixes 206, 208, namely signal interference. Additionally, a summation block 210 can be used to apply the guard tones to assist in interference reduction.

Figure 4:
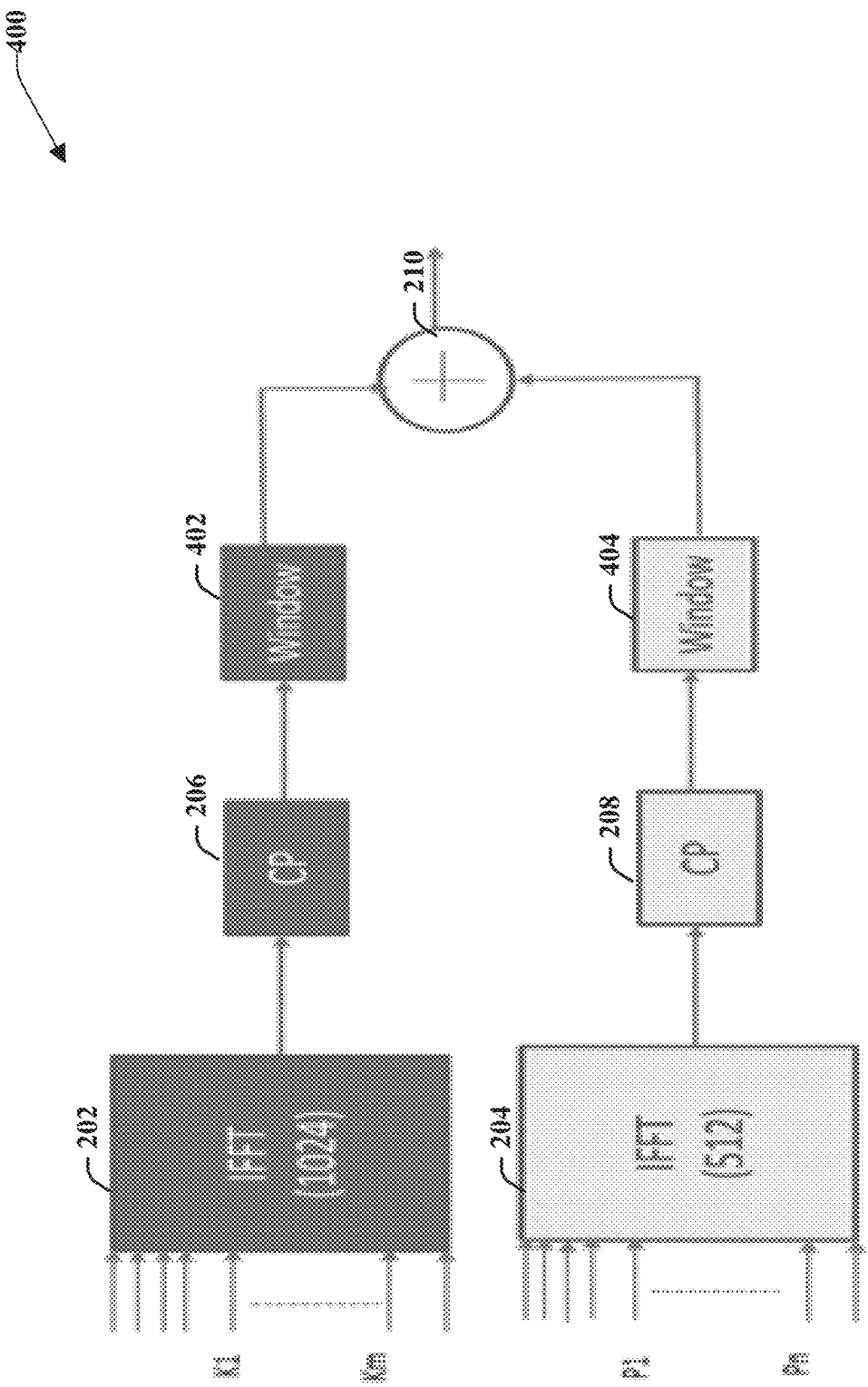
FIG. 4 illustrates an example schematic system block diagram of a windowed orthogonal frequency-division multiplexing with mixed numerology according to one or more embodiments.

Referring now to FIG. 4, illustrated is an example schematic system block diagram of a windowed orthogonal frequency-division multiplexing with mixed numerology according to one or more embodiments. FIG. 4 depicts the block diagram for windowed OFDM with mixed numerology 400. The upper branch 202 uses numerology with subcarrier spacing of 15 KHz spacing, while the lower branch 204 uses subcarrier spacing of 30 KHz. The lower branch 204 can generate two OFDM symbols during the time the upper branch 202 can generate one OFDM symbol. If K1 to Km represent sub carrier indices for 15 KHz spacing and P1 to Pn represent subcarrier indices for 30 KHz spacing, then orthogonality can be lost due to mixed numerology. However, guard tones G, can be used to balance Equation 5, between the numerologies. Therefore, if G is the number of guard tones between these two numerologies, then cyclic-prefixes 206, 208 can be used to mitigate interference introduced by the upper branch 202 and the lower branch 204, respectively. Furthermore, each branch can leverage window technique blocks 402, 404 to minimize interference. The window technique blocks 402, 404 can reduce interference in the time domain of the signals received from the cyclic-prefixes 206, 208. Additionally, a summation block 210 can be used to apply the guard tones to assist in interference reduction.

Figure 5:
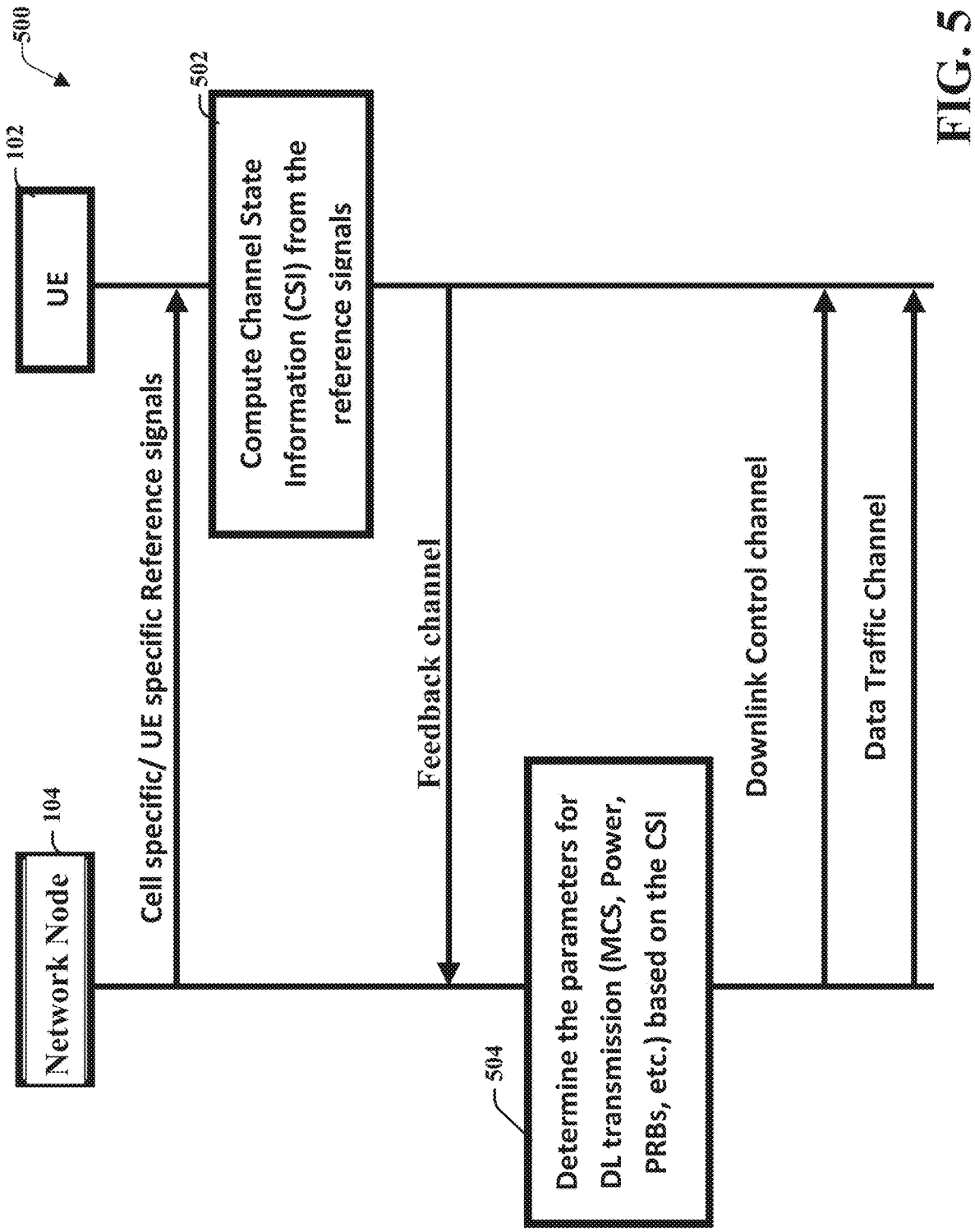
FIG. 5 illustrates an example schematic system block diagram of a message sequence chart between a network node and user equipment according to one or more embodiments.

Referring now to FIG. 5, illustrated is an example schematic system block diagram of a message sequence chart between a network node and user equipment according to one or more embodiments. FIG. 5 depicts a message sequence chart for downlink data transfer in 5G systems 500. The network node 104 can transmit reference signals to a user equipment (UE) 102. The reference signals can be cell specific and/or user equipment 102 specific in relation to a profile of the user equipment 102 or some type of mobile identifier. From the reference signals, the user equipment 102 can compute channel state information (CSI) and compute parameters needed for a CSI report at block 502. The CSI report can comprise: a channel quality indicator (CQI), a pre-coding matrix index (PMI), rank information (RI), a CSI-resource indicator (e.g., CRI the same as beam indicator), etc.

The user equipment 102 can then transmit the CSI report to the network node 104 via a feedback channel either on request from the network node 104, a-periodically, and/or periodically. A network scheduler can leverage the CSI report to determine downlink transmission scheduling parameters at 504, which are particular to the user equipment 102. The scheduling parameters 504 can comprise modulation and coding schemes (MCS), power, physical resource blocks (PRBs), etc. FIG. 5 depicts the physical layer signaling where the density change can be reported for the physical layer signaling or as a part of the radio resource control (RRC) signaling. In the physical layer, the density can be adjusted by the network node 104 and then sent over to the user equipment 102 as a part of the downlink control channel data. The network node 104 can transmit the scheduling parameters, comprising the adjusted densities, to the user equipment 102 via the downlink control channel. Thereafter and/or simultaneously, data can be transferred, via a data traffic channel, from the network node 104 to the user equipment 102.

Figure 6:
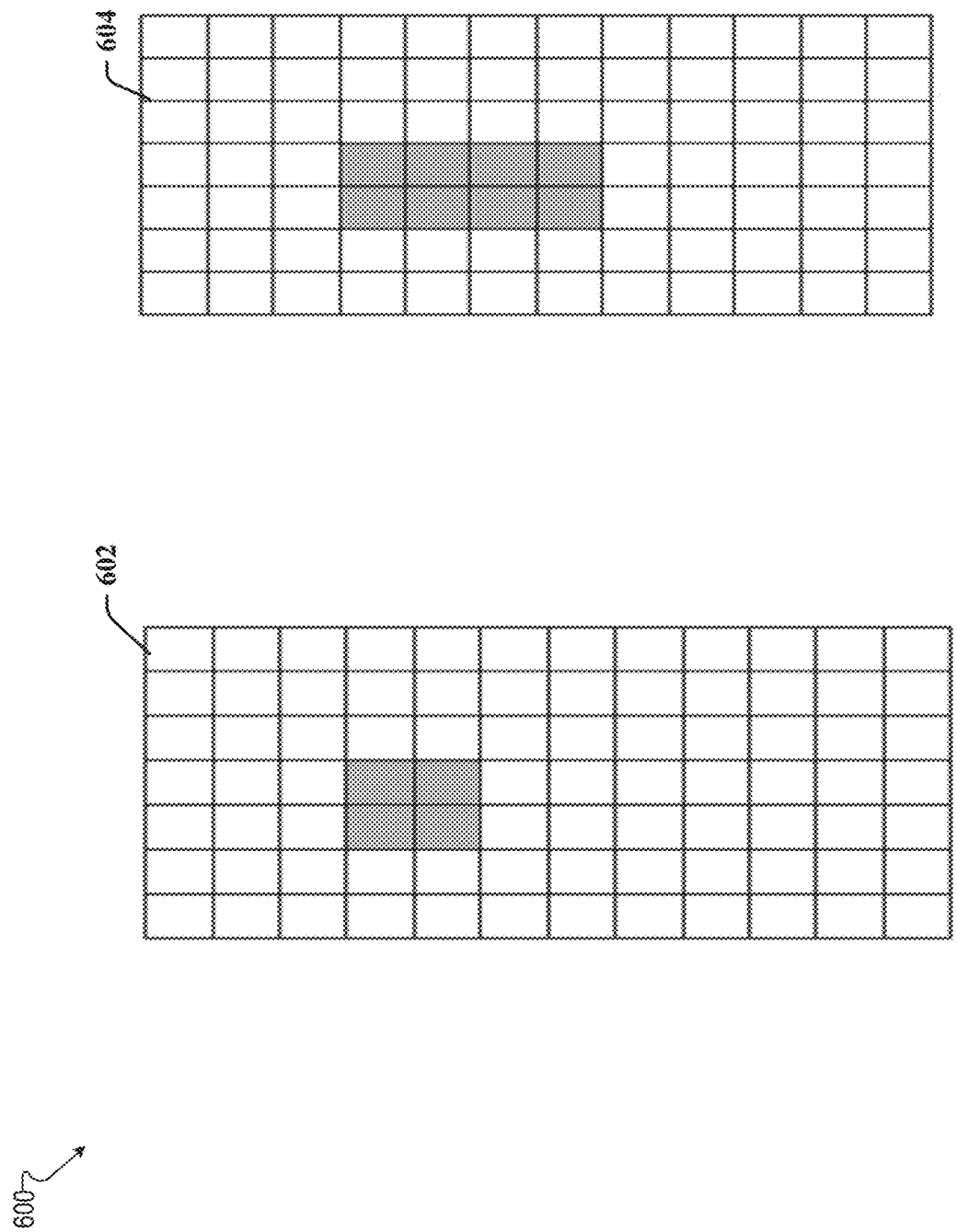
FIG. 6 illustrates an example schematic system block diagram of channel state information reference signal (CSI-RS) density according to one or more embodiments.

Referring now to FIG. 6 illustrates an example schematic system block diagram of channel state information reference signals in reference to multiplexing according to one or more embodiments. Single numerology orthogonal resource sharing between the CSI-RS and PDSCH can work well for LTE since LTE is a single numerology waveform. However, since the PDSCH and the CSI-RS can be related to two different user equipment devices and the numerology can be user equipment specific, the numerology used to carry the PDSCH and the CSI-RS can be different. For instance, for a single numerology, each block of the CSI-RS can leverage equivalent resources of the PDSCH blocks. However, in a mixed numerology case, each CSI-RS is not equivalent to the PDSCH resource blocks, resulting in a portion of the PDSCH resource blocks becoming wasted resources.

Figure 12:
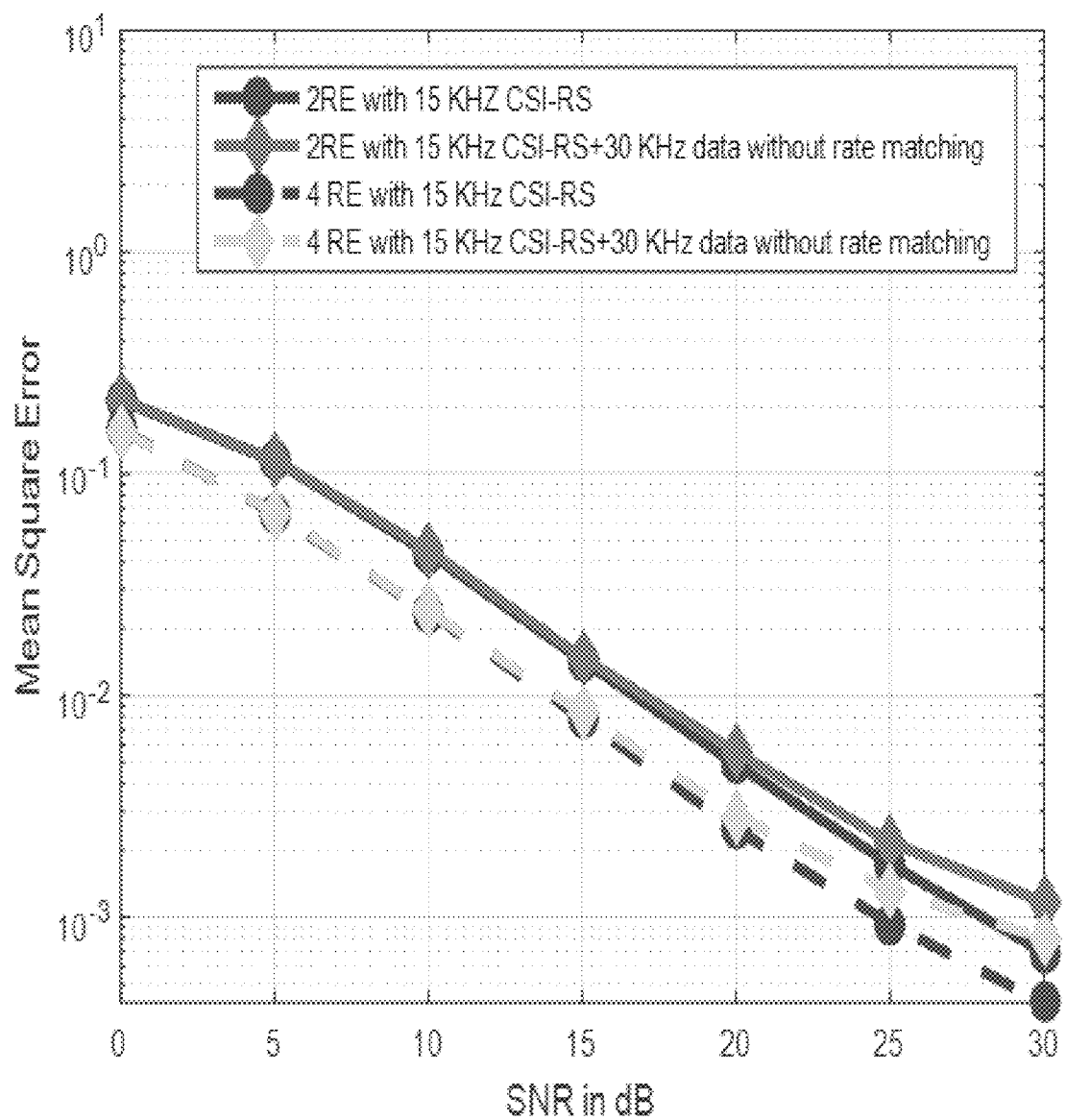
FIG. 12 illustrates is an MSE of the channel estimation when data of a 30 KHz numerology is multiplexed with the CSI-RS of a 15 KHz numerology, which increases the number of CSI-RS resources according to one or more embodiments.
Figure 13:
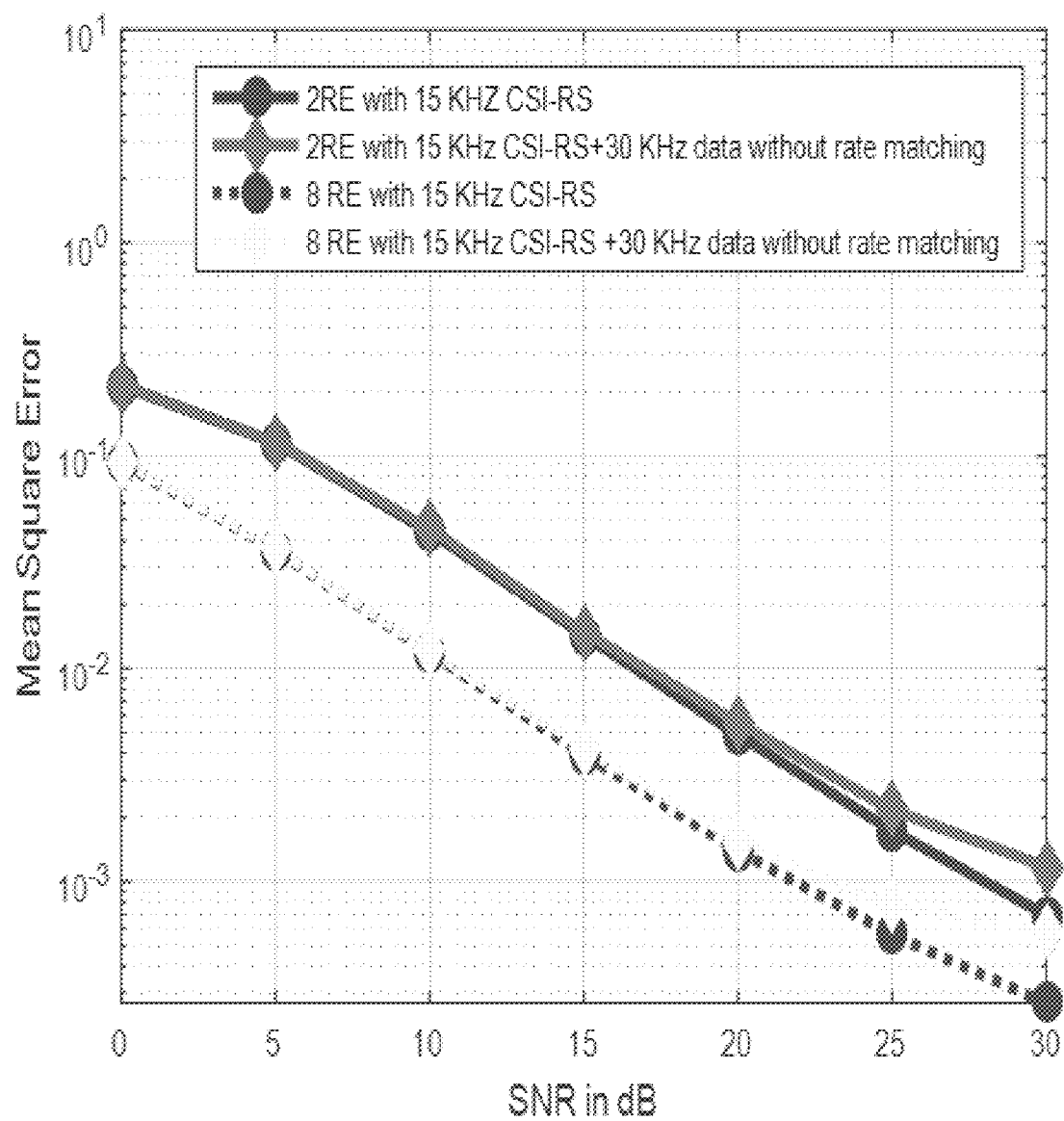
FIG. 13 illustrates an example MSE of the channel estimation when data of a 30 KHz numerology is multiplexed with the CSI-RS of a 15 KHz numerology, which increases the number of CSI-RS resources according to one or more embodiments.

FIG. 6 depicts the CSI-RS configuration for a resource block (e.g., 12 sub carriers). In conventional LTE systems or with single numerology systems, the same pattern can be repeated for all resource blocks in the OFDM bandwidth. However, repeating the same CSI-RS pattern for all resource blocks incurs channel estimation error when mixed numerologies are deployed in the OFDM carrier and when PDSCH of the other numerology is multiplexed with the CSI-RS. Hence, the network can be configured so that the non-uniform CSI-RS density is less in certain resource blocks 602 (e.g., resource blocks where the CSI-RS is not multiplexed) and can be configured for high density CSI-RS in other resource blocks 604 (e.g., where the PDSCH of the other numerology is multiplexed) as shown in system 600. FIGS. 12 and 13 show the mean square error with the increase in CSI-RS density associated with 4 and 8 resource elements compared to the 2 resource elements of CSI-RS.

Figure 7:
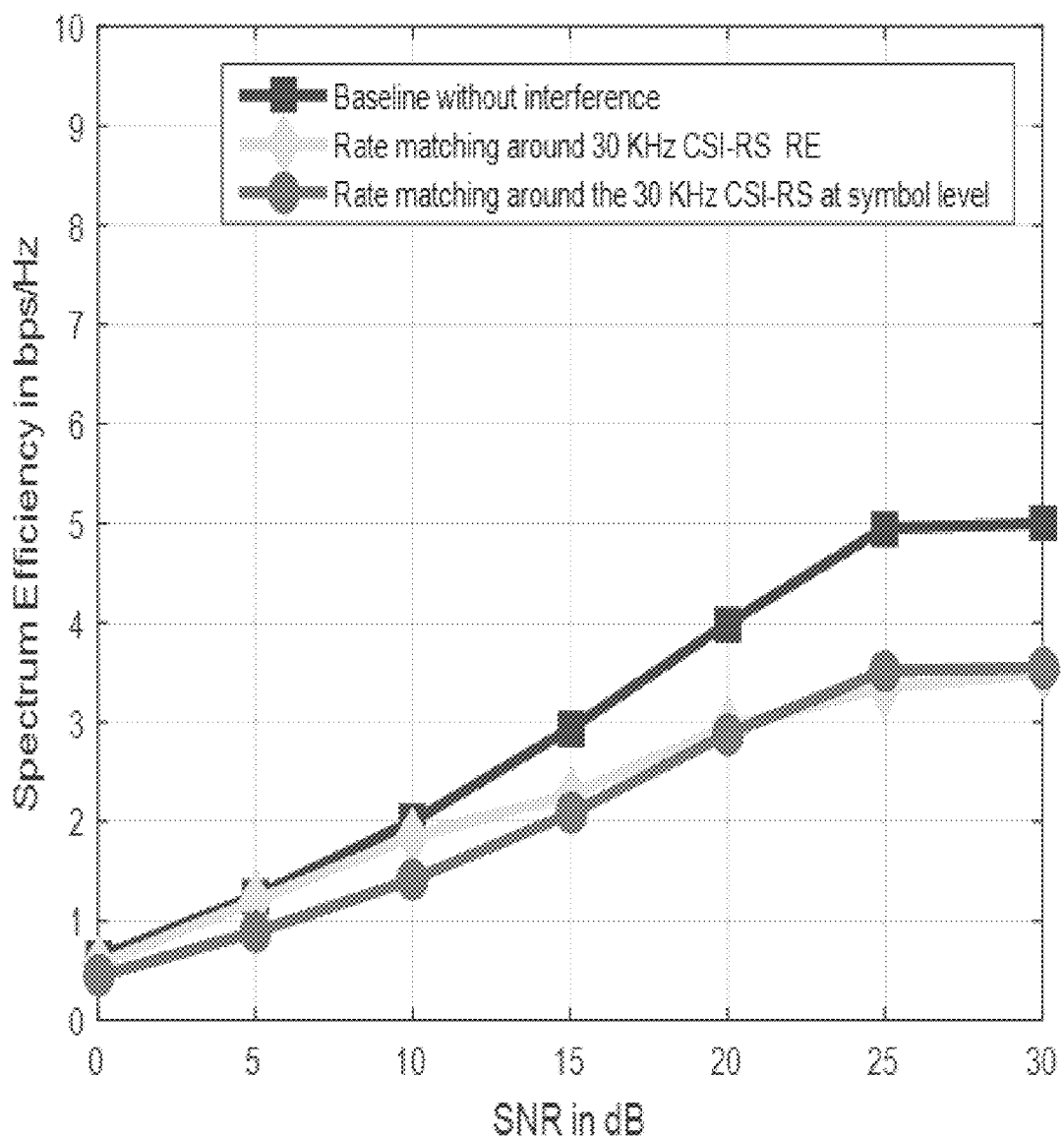
FIG. 7 illustrates an example graph showing the effects of rate matching around CSI-RS of a different numerology according to one or more embodiments.

Referring now to FIG. 7, illustrated is an example graph showing the effects of rate matching around CSI-RS of a different numerology according to one or more embodiments. Performance loss due to rate matching can be reduced by multiplexing the data of one numerology with the CSI-RS of a different numerology, (e.g., avoiding rate matching). In this case, the receiver (advanced receiver) can cancel the interference due to the CSI-RS of the different numerology from the received signal.

Figure 8:
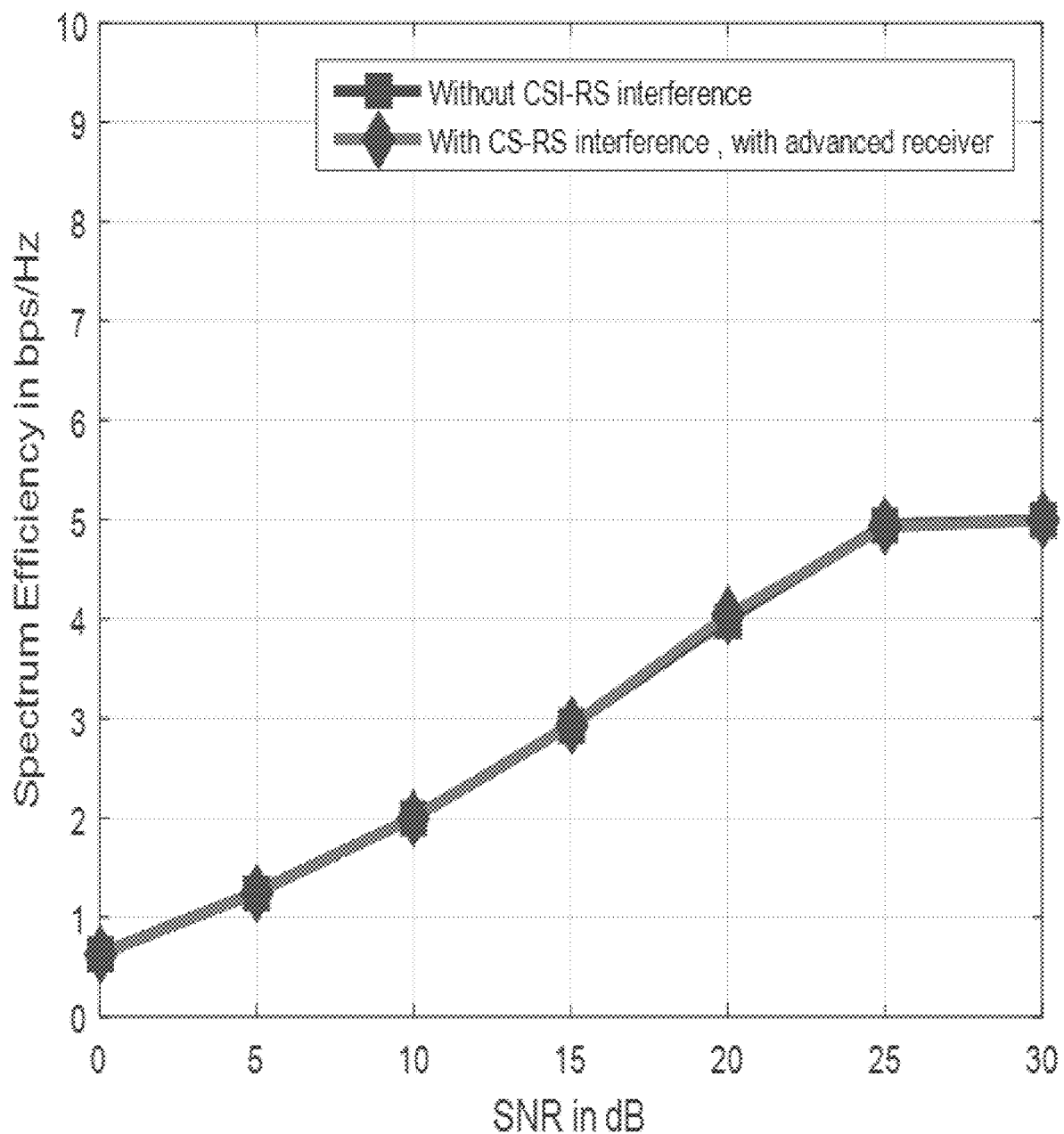
FIG. 8 illustrates an advanced receiver performance graph according to one or more embodiments.

Referring now to FIG. 8, illustrated is an advanced receiver performance graph according to one or more embodiments. FIG. 8 depicts an advanced receiver performance when data of one numerology is multiplexed with the CSI-RS of another numerology generating an increase in spectral efficiency.

Figure 9:
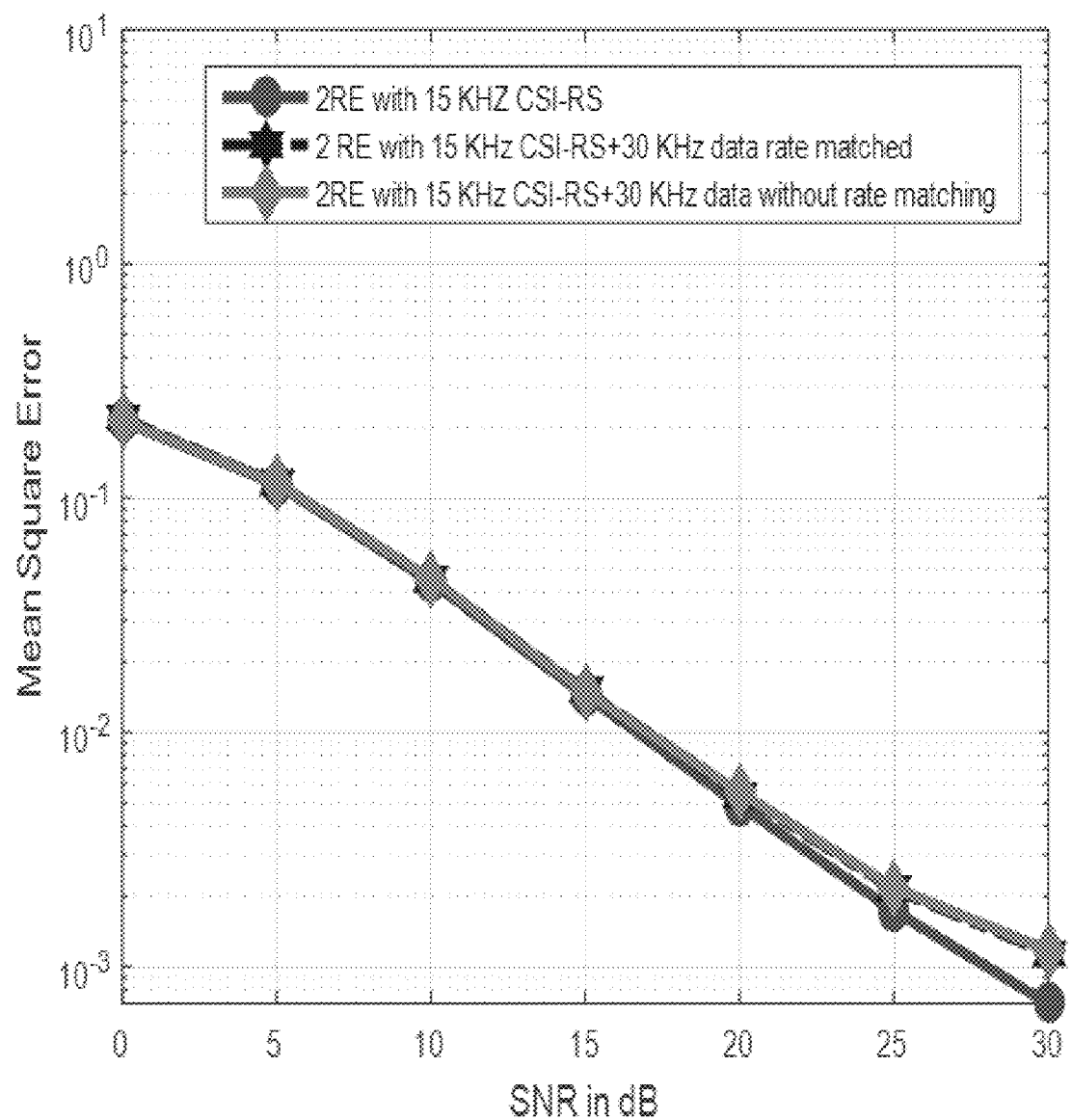
FIG. 9 illustrates a mean squared estimation (MSE) of channel estimation when data of a 30 KHz numerology is multiplexed with the CSI-RS of a 15 KHz numerology according to one or more embodiments.

Referring now to FIG. 9, illustrates a MSE of channel estimation when data of a 30 KHz numerology is multiplexed with the CSI-RS of a 15 KHz numerology according to one or more embodiments. In a mixed numerology scenario, the performance of PDSCH can be improved by multiplexing PDSCH of one numerology with the CSI-RS of another numerology and use of an advanced receiver. However, due to the interference from the PDSCH of the other numerology, the channel estimation for the underlying UE can be impacted as the CSI-RS is corrupted. FIG. 9 shows the mean square error (MSE) with and without rate matching (i.e. data of 30 KHz numerology is multiplexed with CSI-RS of the 15 KHz numerology). In this case, the MSE is the same irrespective of whether the data is rate matched at RE level or multiplexed without rate matching as rate matching is of no use at RE level. Note that at a higher signal-to-noise ratios (SNR), the channel estimation error is predominant as the interference due to higher numerology impacting the channel estimation error. It should be noted that increasing the CSI-RS can be performed in response to determining that the mobile device is experiencing a signal-to-noise ratio that is higher than a previously experienced signal-to-noise ratio.

Figure 10:
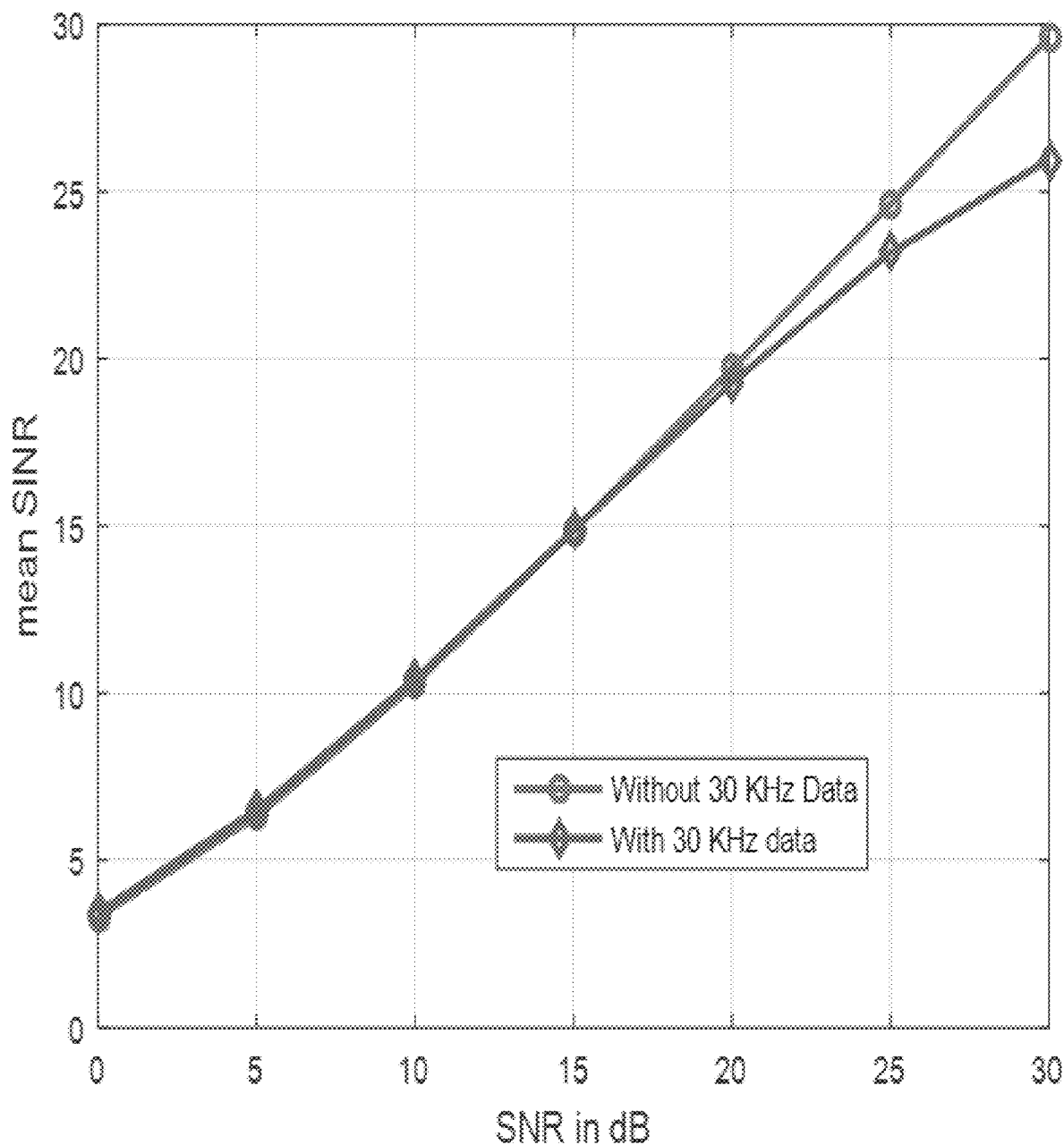
FIG. 10 illustrates a mean signal interference-to-noise ration (SINR) of a 15 KHz numerology with and without a 30 KHz numerology data multiplexing according to one or more embodiments.

Referring now to FIG. 10, illustrated is a mean SINR of 15 KHz numerology with and without 30 KHz numerology data multiplexing according to one or more embodiments. FIG. 10 depicts a mean signal-to-interference plus noise ratio (SINR) of the 15 KHz numerology with and without 30 KHz data that can be observed at low geometries (long term SNR). The mean SINR is not dependent on the 30 KHz interference, however at high geometries, the 30 KHz data can cause degradation in the mean SINR.

Figure 11:
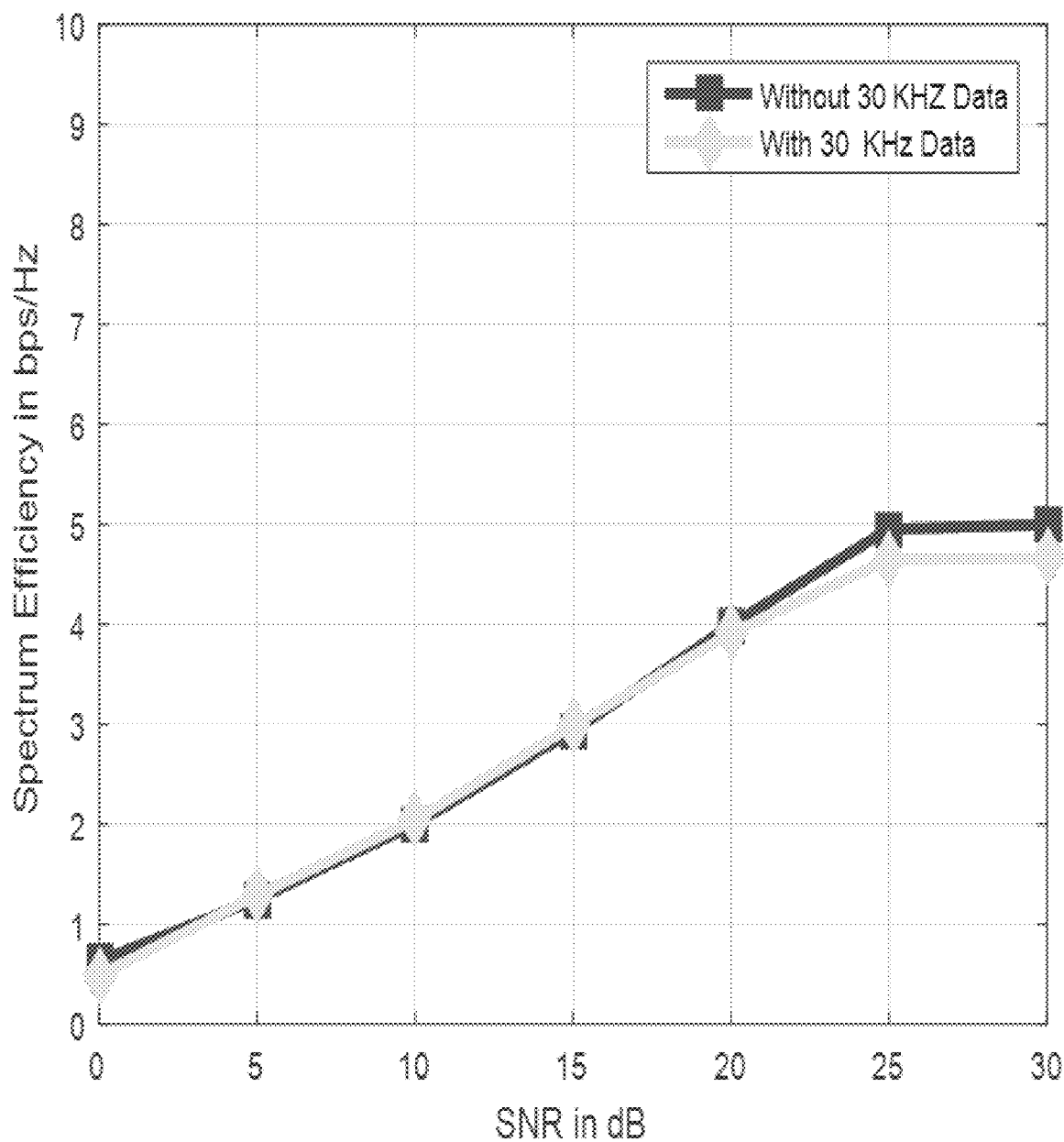
FIG. 11 illustrates performance of a 15 KHz numerology carrier when data of a 30 KHz numerology is multiplexed with CSI-RS of the 15 KHz numerology according to one or more embodiments.

Referring now to FIG. 11, illustrated is performance of a 15 KHz numerology carrier when data of a 30 KHz numerology is multiplexed with CSI-RS of the 15 KHz numerology according to one or more embodiments. FIG. 11 depicts the spectral efficiency impact due to imperfect CSI-RS at SNR due to 30 KHz numerology data. Since the mean SINR is impacted, the performance is impacted at high SNR only. Therefore, multiplexing data of one numerology with the CSI-RS of the other numerology can improve the overall capacity of the system without rate matching. FIG. 9-FIG. 11 depict the performance of the underlying UE, which uses CSI-RS, when data of the other numerology is transmitted (either rate matched or multiplexed on CSI-RS). Consequently, a solution is needed to improve the channels estimation accuracy of the underlying UE in mixed numerology scenarios.

FIG. 12 and FIG. 13 depict the mean square error with the increase in CSI-RS density with 4 resource elements (e.g., resource blocks 602) and 8 resource elements (e.g., resource blocks 604), respectively (as depicted in FIG. 6) compared to the 2 resource elements of the CSI-RS. Referring now to FIG. 12, illustrated is an MSE of the channel estimation when data of a 30 KHz numerology is multiplexed with the CSI-RS of a 15 KHz numerology, which increases the number of CSI-RS resources according to one or more embodiments. Referring now to FIG. 13, illustrated is an example MSE of the channel estimation when data of a 30 KHz numerology is multiplexed with the CSI-RS of a 15 KHz numerology, which increases the number of CSI-RS resources according to one or more embodiments. Consequently, as indicated by the graph, 8 resource elements have changed density prompting the MSE to be almost equivalent to where the 2 resource elements are at 15 Khz. Hence, the base station can change density when the scheduled corresponding UE is at high SNR.

Figure 14:
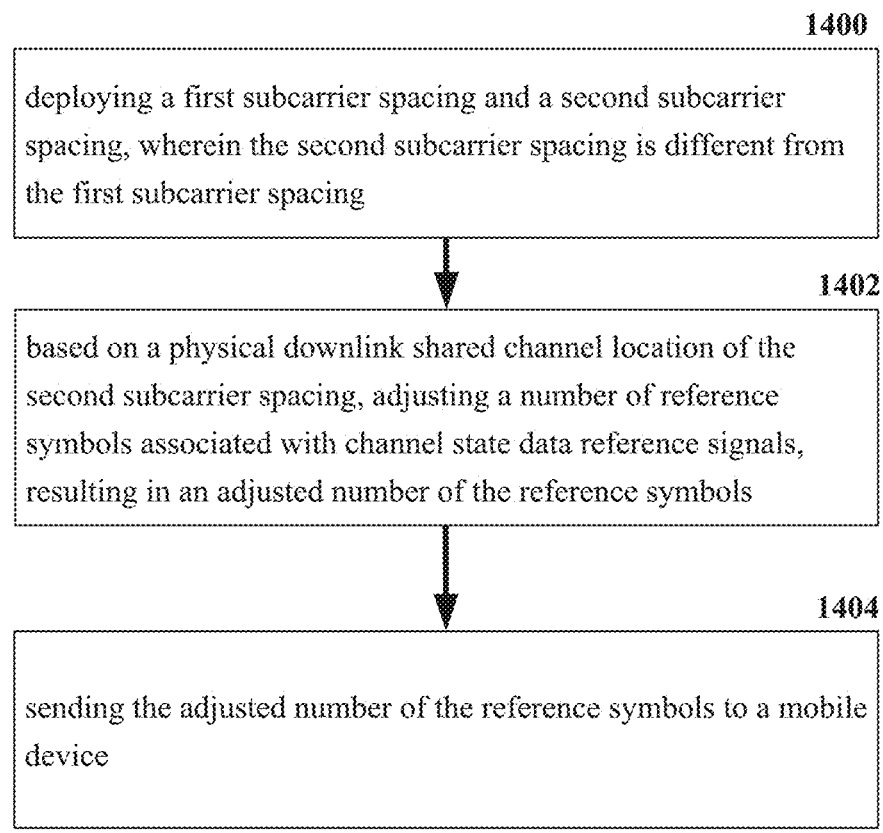
FIG. 14 illustrates an example flow diagram for adjusting a number of CSI-RS reference symbols for a 5G network according to one or more embodiments.

Referring now to FIG. 14, illustrated is an example flow diagram for adjusting a number of CSI-RS reference symbols for a 5G network according to one or more embodiments. At element 1400, a network device (e.g., network node 104) can deploy a first subcarrier spacing and a second subcarrier spacing, wherein the second subcarrier spacing is different from the first subcarrier spacing. Based on a physical downlink shared channel location of the second subcarrier spacing, at element 1402, the network device (e.g., network node 104) can adjust a number of reference symbols associated with channel state data reference signals, resulting in an adjusted number of the reference symbols. Consequently, at element 1404, the network device (e.g., network node 104) can send the adjusted number of the reference symbols to a mobile device (e.g., user equipment 102).

Figure 15:
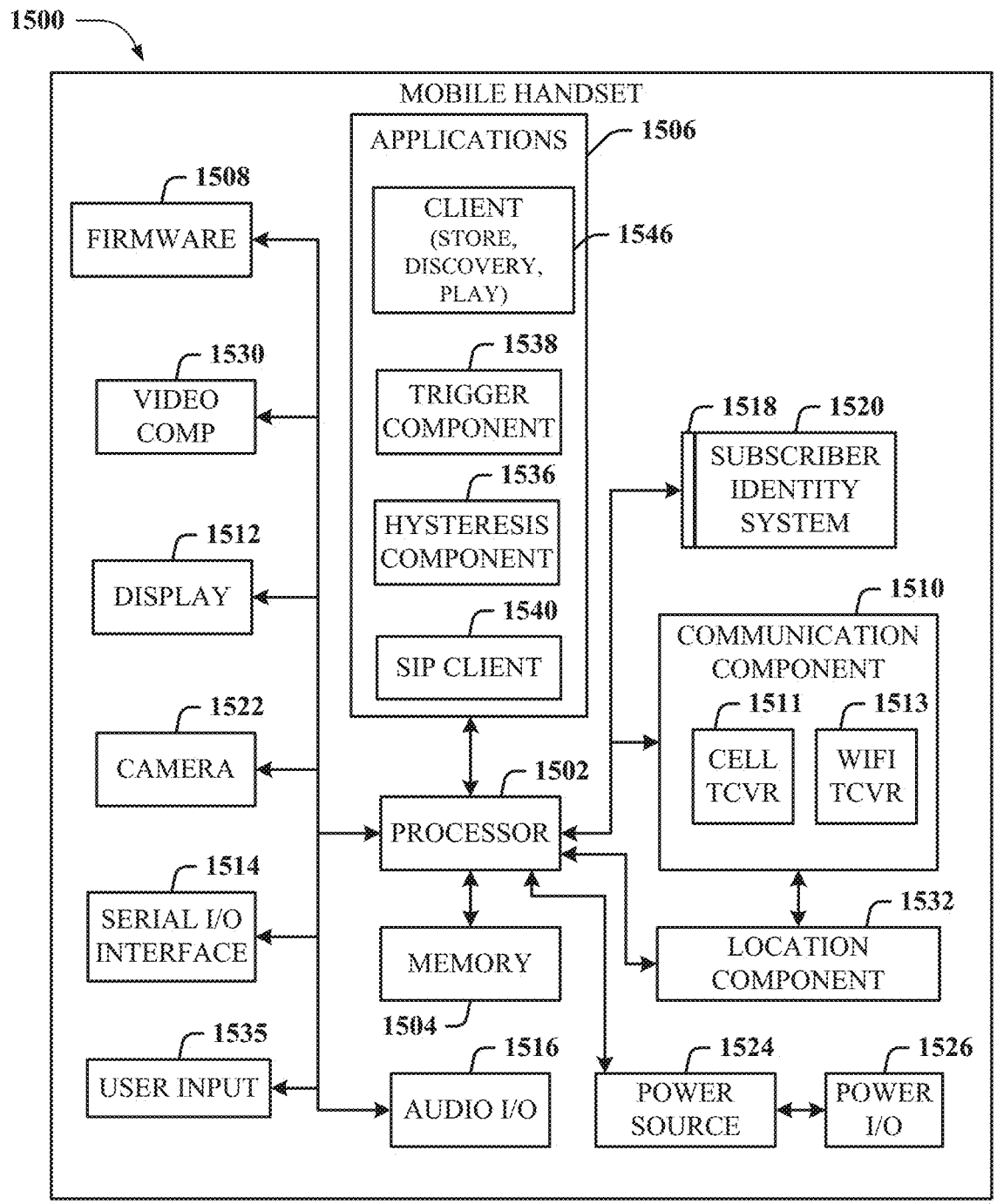
FIG. 15 illustrates an example block diagram of an example mobile handset operable to engage in a system architecture that facilitates secure wireless communication according to one or more embodiments described herein.

Referring now to FIG. 15, illustrated is a schematic block diagram of an exemplary end-user device such as a mobile device 1500 capable of connecting to a network in accordance with some embodiments described herein. Although a mobile handset 1500 is illustrated herein, it will be understood that other devices can be a mobile device, and that the mobile handset 1500 is merely illustrated to provide context for the embodiments of the various embodiments described herein. The following discussion is intended to provide a brief, general description of an example of a suitable environment 1500 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1500 includes a processor 1502 for controlling and processing all onboard operations and functions. A memory 1504 interfaces to the processor 1502 for storage of data and one or more applications 1506 (e.g., a video player software, user feedback component software, etc.). Other applications can include voice recognition of predetermined voice commands that facilitate initiation of the user feedback signals. The applications 1506 can be stored in the memory 1504 and/or in a firmware 1508, and executed by the processor 1502 from either or both the memory 1504 or/and the firmware 1508. The firmware 1508 can also store startup code for execution in initializing the handset 1500. A communications component 1510 interfaces to the processor 1502 to facilitate wired/wireless communication with external systems, e.g., cellular networks, VoIP networks, and so on. Here, the communications component 1510 can also include a suitable cellular transceiver 1511 (e.g., a GSM transceiver) and/or an unlicensed transceiver 1513 (e.g., Wi-Fi, WiMax) for corresponding signal communications. The handset 1500 can be a device such as a cellular telephone, a PDA with mobile communications capabilities, and messaging-centric devices. The communications component 1510 also facilitates communications reception from terrestrial radio networks (e.g., broadcast), digital satellite radio networks, and Internet-based radio services networks.

The handset 1500 includes a display 1512 for displaying text, images, video, telephony functions (e.g., a Caller ID function), setup functions, and for user input. For example, the display 1512 can also be referred to as a "screen" that can accommodate the presentation of multimedia content (e.g., music metadata, messages, wallpaper, graphics, etc.). The display 1512 can also display videos and can facilitate the generation, editing and sharing of video quotes. A serial I/O interface 1514 is provided in communication with the processor 1502 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1500, for example. Audio capabilities are provided with an audio I/O component 1516, which can include a speaker for the output of audio signals related to, for example, indication that the user pressed the proper key or key combination to initiate the user feedback signal. The audio I/O component 1516 also facilitates the input of audio signals through a microphone to record data and/or telephony voice data, and for inputting voice signals for telephone conversations.

The handset 1500 can include a slot interface 1518 for accommodating a SIC (Subscriber Identity Component) in the form factor of a card Subscriber Identity Module (SIM) or universal SIM 1520, and interfacing the SIM card 1520 with the processor 1502. However, it is to be appreciated that the SIM card 1520 can be manufactured into the handset 1500, and updated by downloading data and software.

The handset 1500 can process IP data traffic through the communication component 1510 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1522 (e.g., a camera) can be provided for decoding encoded multimedia content. The video processing component 1522 can aid in facilitating the generation, editing and sharing of video quotes. The handset 1500 also includes a power source 1524 in the form of batteries and/or an AC power subsystem, which power source 1524 can interface to an external power system or charging equipment (not shown) by a power I/O component 1526.

The handset 1500 can also include a video component 1530 for processing video content received and, for recording and transmitting video content. For example, the video component 1530 can facilitate the generation, editing and sharing of video quotes. A location tracking component 1532 facilitates geographically locating the handset 1500. As described hereinabove, this can occur when the user initiates the feedback signal automatically or manually. A user input component 1534 facilitates the user initiating the quality feedback signal. The user input component 1534 can also facilitate the generation, editing and sharing of video quotes. The user input component 1534 can include such conventional input device technologies such as a keypad, keyboard, mouse, stylus pen, and/or touch screen, for example.

Referring again to the applications 1506, a hysteresis component 1536 facilitates the analysis and processing of hysteresis data, which is utilized to determine when to associate with the access point. A software trigger component 1538 can be provided that facilitates triggering of the hysteresis component 1538 when the Wi-Fi transceiver 1513 detects the beacon of the access point. A SIP client 1540 enables the handset 1500 to support SIP protocols and register the subscriber with the SIP registrar server. The applications 1506 can also include a client 1542 that provides at least the capability of discovery, play and store of multimedia content, for example, music.

The handset 1500, as indicated above related to the communications component 810, includes an indoor network radio transceiver 1513 (e.g., Wi-Fi transceiver). This function supports the indoor radio link, such as IEEE 802.11, for the dual-mode GSM handset 1500. The handset 1500 can accommodate at least satellite radio services through a handset that can combine wireless voice and digital radio chipsets into a single handheld device.

Figure 16:
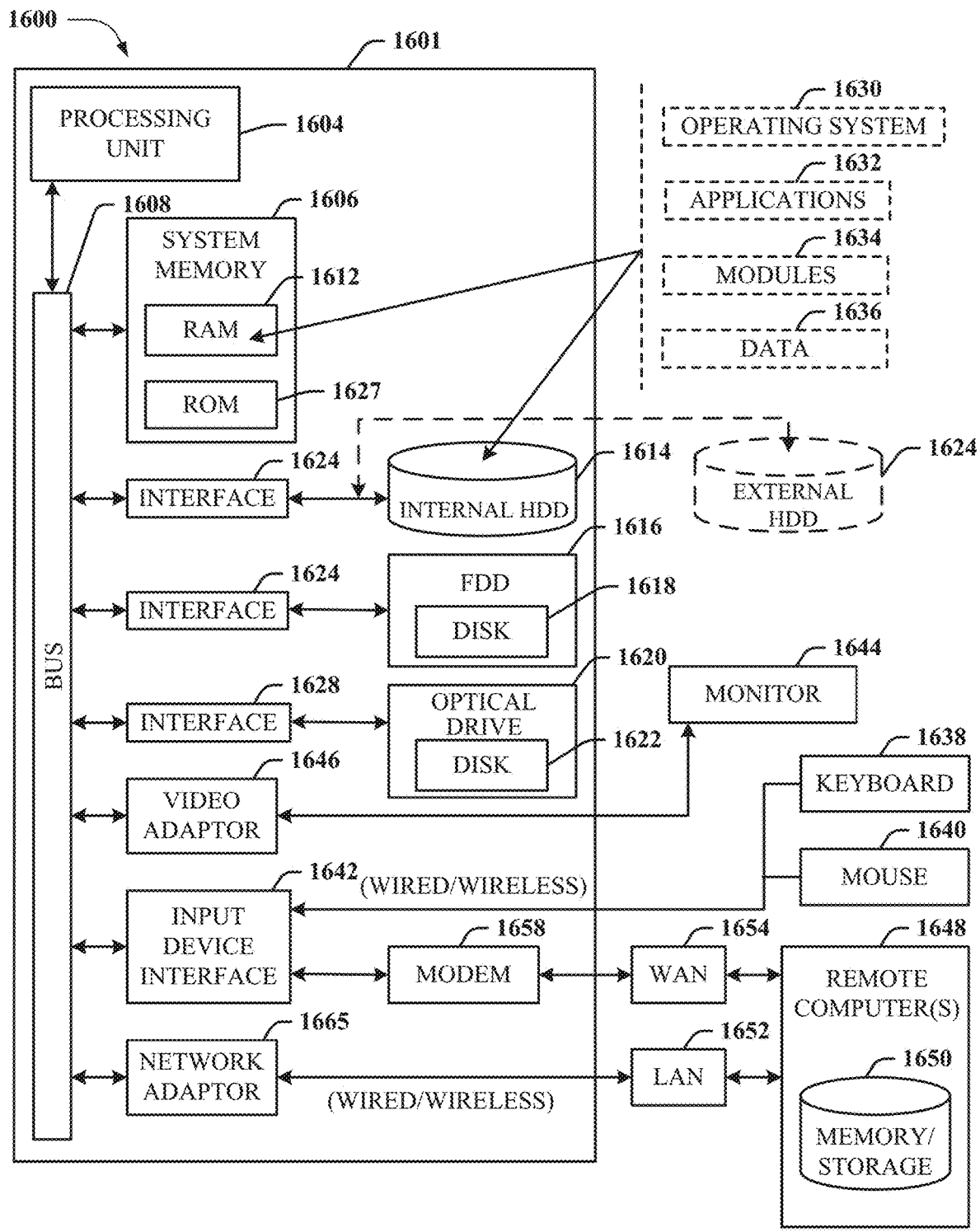
FIG. 16 illustrates an example block diagram of an example computer operable to engage in a system architecture that facilitates secure wireless communication according to one or more embodiments described herein.

Referring now to FIG. 16, there is illustrated a block diagram of a computer 1600 operable to execute a system architecture that facilitates establishing a transaction between an entity and a third party. The computer 1600 can provide networking and communication capabilities between a wired or wireless communication network and a server (e.g., Microsoft server) and/or communication device. In order to provide additional context for various aspects thereof, FIG. 16 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 16, implementing various aspects described herein with regards to the end-user device can include a computer 1600, the computer 1600 including a processing unit 1604, a system memory 1606 and a system bus 1608. The system bus 1608 couples system components including, but not limited to, the system memory 1606 to the processing unit 1604. The processing unit 1604 can be any of various commercially available processors. Dual microprocessors and other multi processor architectures can also be employed as the processing unit 1604.

The system bus 1608 can be any of several types of bus structure that can further interconnect to a memory bus (with or without a memory controller), a peripheral bus, and a local bus using any of a variety of commercially available bus architectures. The system memory 1606 includes read-only memory (ROM) 1627 and random access memory (RAM) 1612. A basic input/output system (BIOS) is stored in a non-volatile memory 1627 such as ROM, EPROM, EEPROM, which BIOS contains the basic routines that help to transfer information between elements within the computer 1600, such as during start-up. The RAM 1612 can also include a high-speed RAM such as static RAM for caching data.

The computer 1600 further includes an internal hard disk drive (HDD) 1614 (e.g., EIDE, SATA), which internal hard disk drive 1614 can also be configured for external use in a suitable chassis (not shown), a magnetic floppy disk drive (FDD) 1616, (e.g., to read from or write to a removable diskette 1618) and an optical disk drive 1620, (e.g., reading a CD-ROM disk 1622 or, to read from or write to other high capacity optical media such as the DVD). The hard disk drive 1614, magnetic disk drive 1616 and optical disk drive 1620 can be connected to the system bus 1608 by a hard disk drive interface 1624, a magnetic disk drive interface 1626 and an optical drive interface 1628, respectively. The interface 1624 for external drive implementations includes at least one or both of Universal Serial Bus (USB) and IEEE 1694 interface technologies. Other external drive connection technologies are within contemplation of the subject innovation.

The drives and their associated computer-readable media provide nonvolatile storage of data, data structures, computer-executable instructions, and so forth. For the computer 1600 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1600, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1612, including an operating system 1630, one or more application programs 1632, other program modules 1634 and program data 1636. All or portions of the operating system, applications, modules, and/or data can also be cached in the RAM 1612. It is to be appreciated that the innovation can be implemented with various commercially available operating systems or combinations of operating systems.

A user can enter commands and information into the computer 1600 through one or more wired/wireless input devices, e.g., a keyboard 1638 and a pointing device, such as a mouse 1640. Other input devices (not shown) may include a microphone, an IR remote control, a joystick, a game pad, a stylus pen, touch screen, or the like. These and other input devices are often connected to the processing unit 1604 through an input device interface 1642 that is coupled to the system bus 1608, but can be connected by other interfaces, such as a parallel port, an IEEE 2394 serial port, a game port, a USB port, an IR interface, etc.

A monitor 1644 or other type of display device is also connected to the system bus 1608 through an interface, such as a video adapter 1646. In addition to the monitor 1644, a computer 1600 typically includes other peripheral output devices (not shown), such as speakers, printers, etc.

The computer 1600 can operate in a networked environment using logical connections by wired and/or wireless communications to one or more remote computers, such as a remote computer(s) 1648. The remote computer(s) 1648 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1650 is illustrated. The logical connections depicted include wired/wireless connectivity to a local area network (LAN) 1652 and/or larger networks, e.g., a wide area network (WAN) 1654. Such LAN and WAN networking environments are commonplace in offices and companies, and facilitate enterprise-wide computer networks, such as intranets, all of which may connect to a global communications network, e.g., the Internet.

When used in a LAN networking environment, the computer 1600 is connected to the local network 1652 through a wired and/or wireless communication network interface or adapter 1656. The adapter 1656 may facilitate wired or wireless communication to the LAN 1652, which may also include a wireless access point disposed thereon for communicating with the wireless adapter 1656.

When used in a WAN networking environment, the computer 1600 can include a modem 1658, or is connected to a communications server on the WAN 1654, or has other means for establishing communications over the WAN 1654, such as by way of the Internet. The modem 1658, which can be internal or external and a wired or wireless device, is connected to the system bus 1608 through the input device interface 1642. In a networked environment, program modules depicted relative to the computer, or portions thereof, can be stored in the remote memory/storage device 1650. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

An important aspect of 5G, which differentiates from previous 4G systems, is the use of multiple numerologies. LTE systems use a single numerology throughout the whole in band (i.e., within LTE bandwidth, for example 10 MHz, all the sub carriers have spacing or bandwidth of 15 KHz). However, since 5G can support various applications, a single numerology, as in LTE, is not efficient. Hence multiple numerologies are defined to serve diverse applications. For example multiple sub carriers spacing such as 15 KHz, 30 KHz, 60 KHz, 120 KHz, 240 KHz and 480 KHz.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   based on a physical downlink shared channel location associated with a subcarrier spacing, adjusting, by network equipment comprising a processor, a number of reference symbols associated with channel state information reference signals, resulting in an adjusted number of the reference symbols, wherein the adjusting increases a density of the channel state information reference signals in relation to the physical downlink shared channel location;
   based on the adjusted number of the reference symbols, configuring, by the network equipment, a resource block associated with the subcarrier spacing, resulting in a resource block pattern, wherein the configuring comprises generating a time value for use with the adjusted number of the reference symbols, and wherein the resource block is allocated for a transmission of channel state information; and
   in response to multiplexing a physical downlink shared channel with the channel state information reference signals, indicating, by the network equipment, the density of the channel state information reference signals on the resource block in relation to the physical downlink shared channel location.

2. The method of claim 1, further comprising:
   sending, by the network equipment, the resource block pattern of the reference symbols to a mobile device.

3. The method of claim 1, further comprising:
   sending, by the network equipment, the time value of the reference symbols to a mobile device.

4. The method of claim 1, further comprising:
   sending, by the network equipment, the adjusted number of the reference symbols to a mobile device.

5. The method of claim 4, wherein the sending the adjusted number of the reference symbols further comprises:
   sending a request to send the channel state information reference signals at an aperiodic time interval.

6. The method of claim 1, wherein the number of reference symbols comprises a channel quality indicator representative of a quality of a channel between network devices.

7. The method of claim 1, further comprising:
requesting, by the network equipment, to send the channel state information, associated with the channel state information reference signals, to a mobile device.

8. The method of claim 1, further comprising:
sending, by the network equipment, instruction data indicative of an instruction to send the channel state information at a time interval.

9. The method of claim 8, wherein the time interval is an irregular time interval.

10. Network equipment, comprising:
a processor; and
a memory that stores executable instructions that, when executed by the processor, facilitate performance of operations, comprising:
based on a physical downlink shared channel of a subcarrier spacing, adjusting variable reference symbols of channel state data reference signals, resulting in adjusted variable reference symbols of the channel state data reference signals, wherein the adjusting increases a density of the channel state data reference signals in relation to a location of the physical downlink channel;
based on the adjusted variable reference symbols, configuring a resource block associated with the subcarrier spacing, resulting in a resource block pattern, wherein the resource block is allocated for a transmission of channel state data; and
in response to multiplexing the physical downlink shared channel with the channel state data reference signals, indicating the density of the channel state data reference signals on the resource block in relation to the location.

11. The network equipment of claim 10, wherein the adjusting comprises increasing a number of the variable reference symbols of the channel state data reference signals.

12. The network equipment of claim 10, wherein the adjusting comprises modifying a number of the variable reference symbols of the channel state data reference signals.

13. The network equipment of claim 10, wherein the operations further comprise:
sending data associated with the adjusted variable reference symbols of the channel state data reference signals to a mobile device.

14. The network equipment of claim 10, wherein the operations further comprise:
transmitting data associated with the resource block pattern to a mobile device.

15. The network equipment of claim 14, wherein the transmitting the data comprises transmitting the data to the mobile device via a physical layer signaling.

16. The network equipment of claim 10, wherein the operations further comprise:
based on an on-demand request, requesting to send the channel state data to a mobile device.

17. A non-transitory machine-readable medium, comprising executable instructions that, when executed by a processor, facilitate performance of operations, comprising:
based on a physical downlink shared channel location of a subcarrier spacing, increasing symbols of channel state data reference signals, resulting in additional symbols of the channel state data reference signals other than the symbols of the channel state data reference signals wherein the increasing increases a density of the channel state data reference signals in relation to the physical downlink shared channel location;
in response to the increasing the symbols of the channel state data reference signals, configuring a resource block associated with the subcarrier spacing, resulting in a resource block pattern associated with a time value for use of the additional symbols, wherein the resource block is allocated for a transmission of channel state data; and
in response to multiplexing a physical downlink shared channel with the channel state data reference signals, specifying the density of the channel state data reference signals on the resource block in relation to the physical downlink shared channel location.

18. The non-transitory machine-readable medium of claim 17, wherein the operations further comprise:
transmitting data associated with the additional symbols of the channel state data reference signals, the resource block pattern, and the time value to a mobile device.

19. The non-transitory machine-readable medium of claim 17, wherein the operations further comprise:
scheduling the subcarrier spacing within a first part of an orthogonal frequency division multiplexing bandwidth.

20. The non-transitory machine-readable medium of claim 17, wherein the subcarrier spacing is a first subcarrier spacing, and wherein the operations further comprise:
deploying a second subcarrier spacing, wherein the second subcarrier spacing is different from the first subcarrier spacing.

* * * * *